INVENTOR.
OTIS E. STAPLES

INVENTOR.
OTIS E. STAPLES
BY Hudson, Doughton,
Williams, David & Hoffmann
ATTORNEYS

INVENTOR.
OTIS E. STAPLES

Dec. 11, 1956  O. E. STAPLES  2,773,407
TURNING MACHINE
Filed June 30, 1951  9 Sheets-Sheet 4
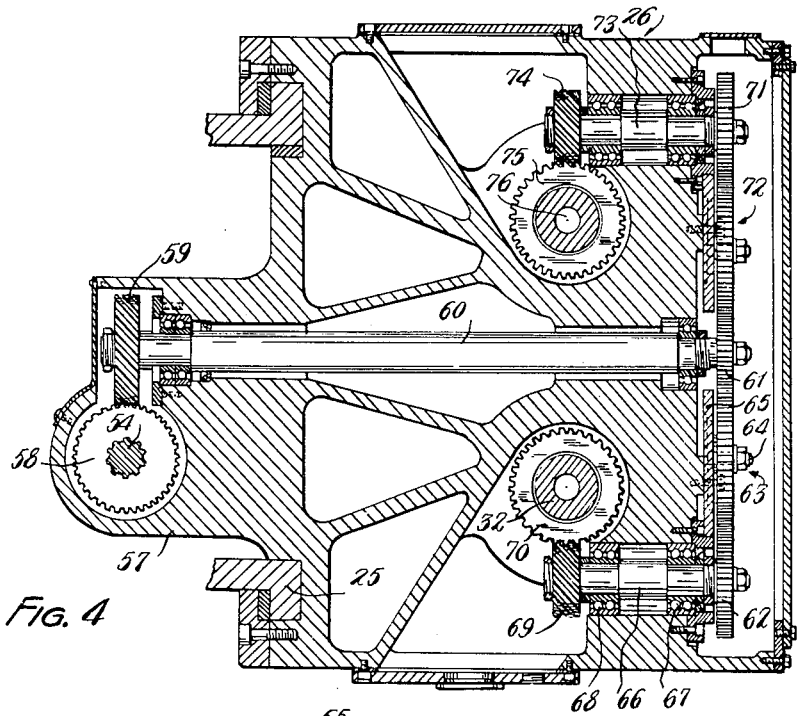
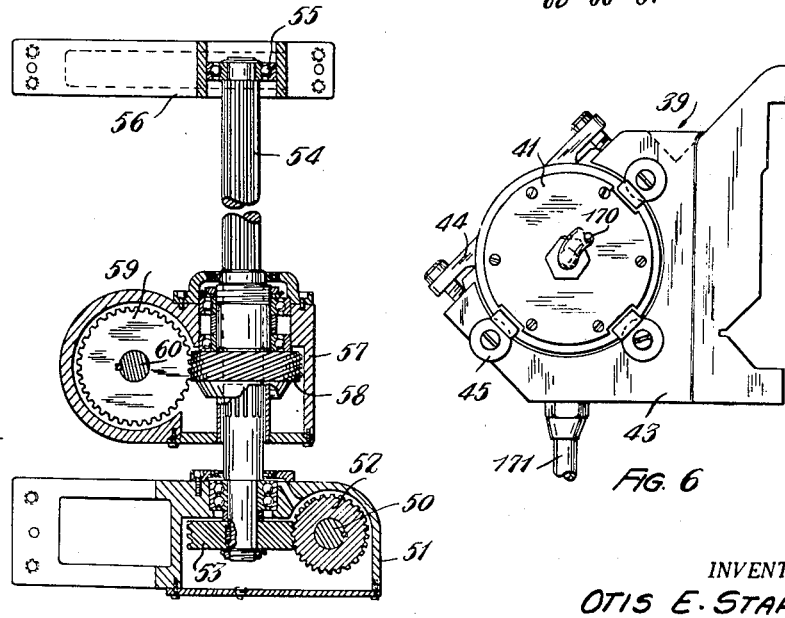
INVENTOR.
OTIS E. STAPLES
BY Hudson, Boughton,
Williams, David & Hoffmann
ATTORNEYS Dec. 11, 1956 O. E. STAPLES 2,773,407
TURNING MACHINE
Filed June 30, 1951 9 Sheets-Sheet 5
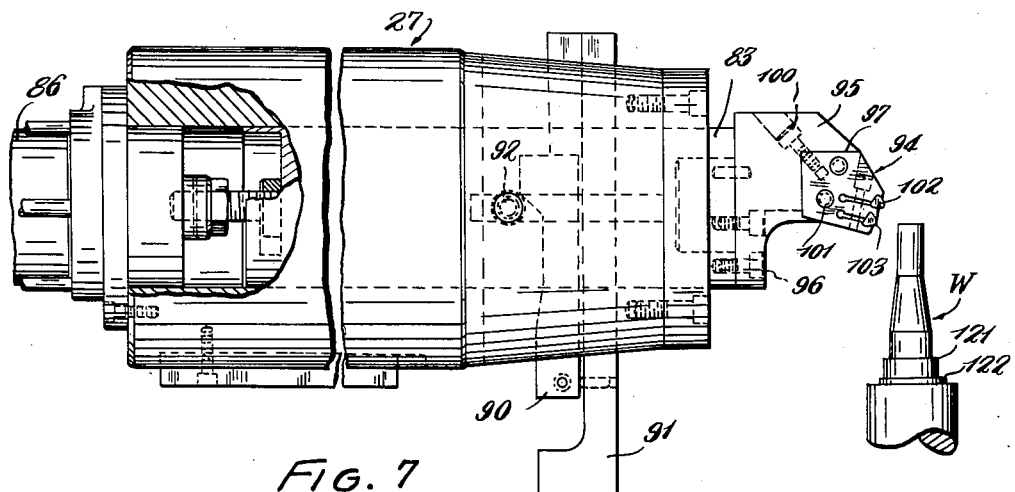
FIG. 7
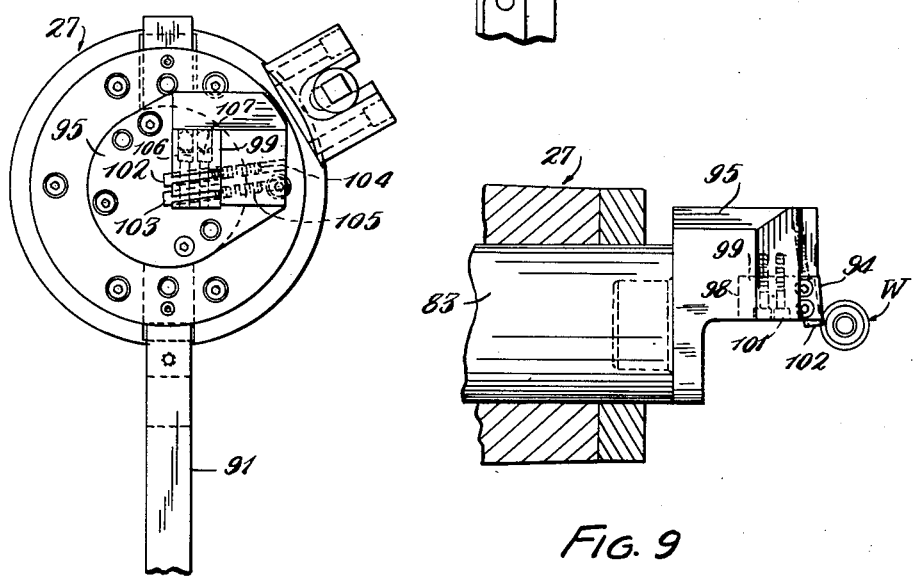
FIG. 8
FIG. 9
INVENTOR.
OTIS E. STAPLES
BY Hudson, Boughton,
Williams, David & Hoffmann.
ATTORNEYS

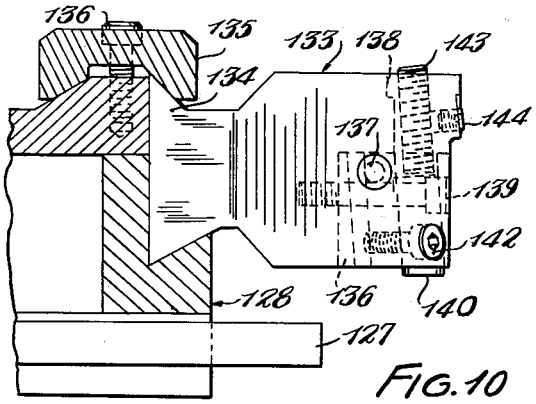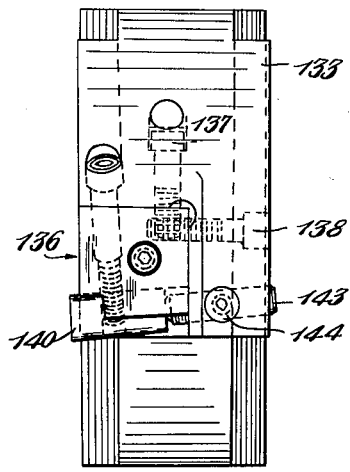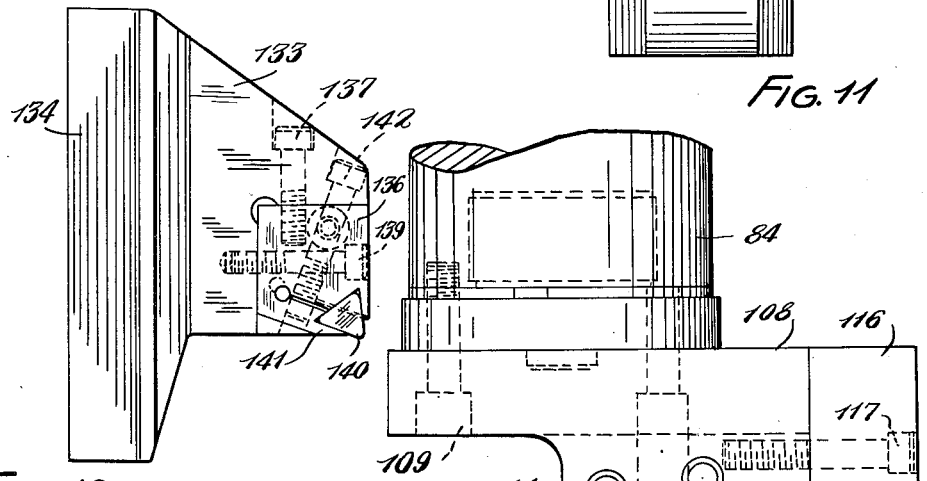

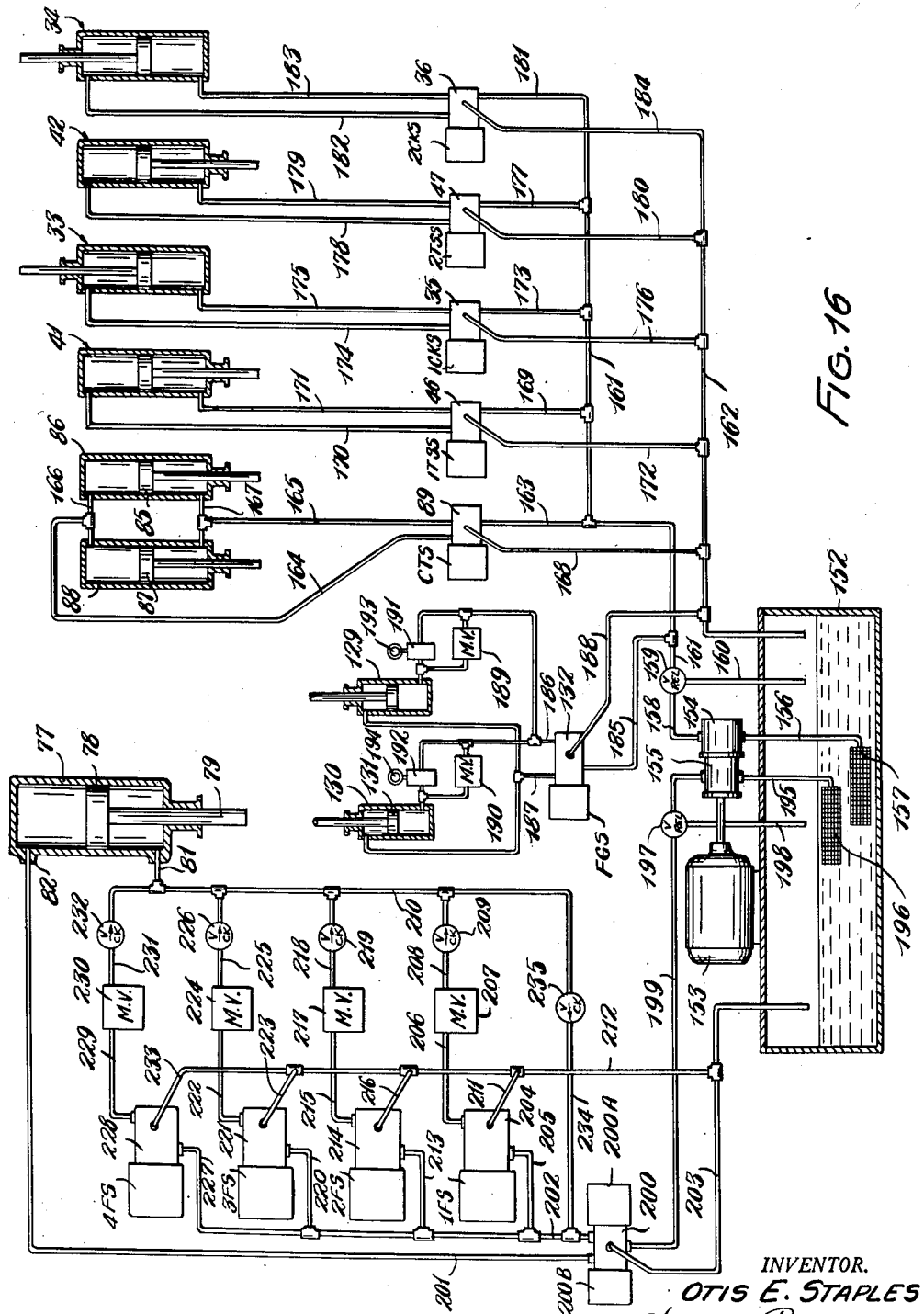

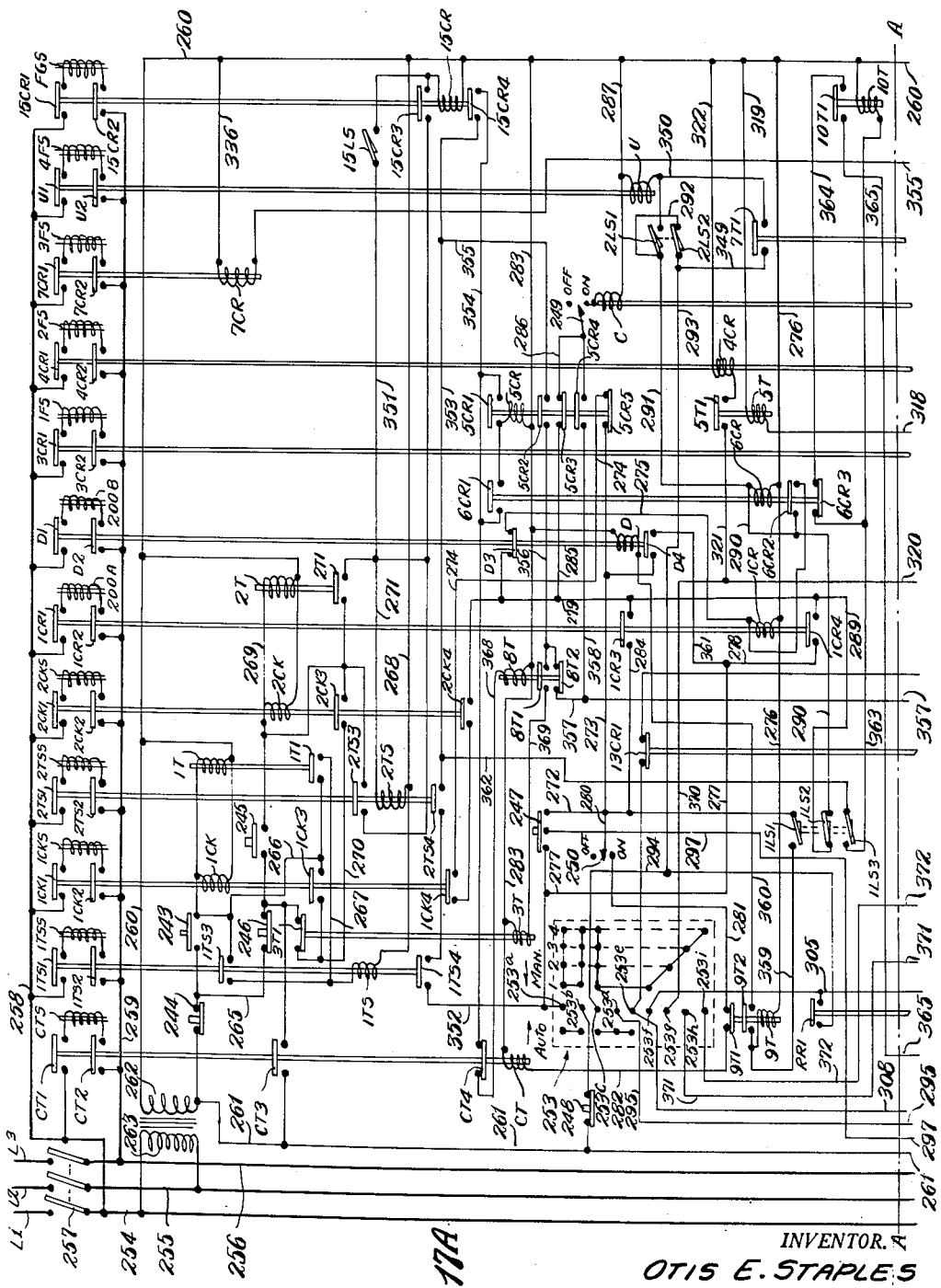

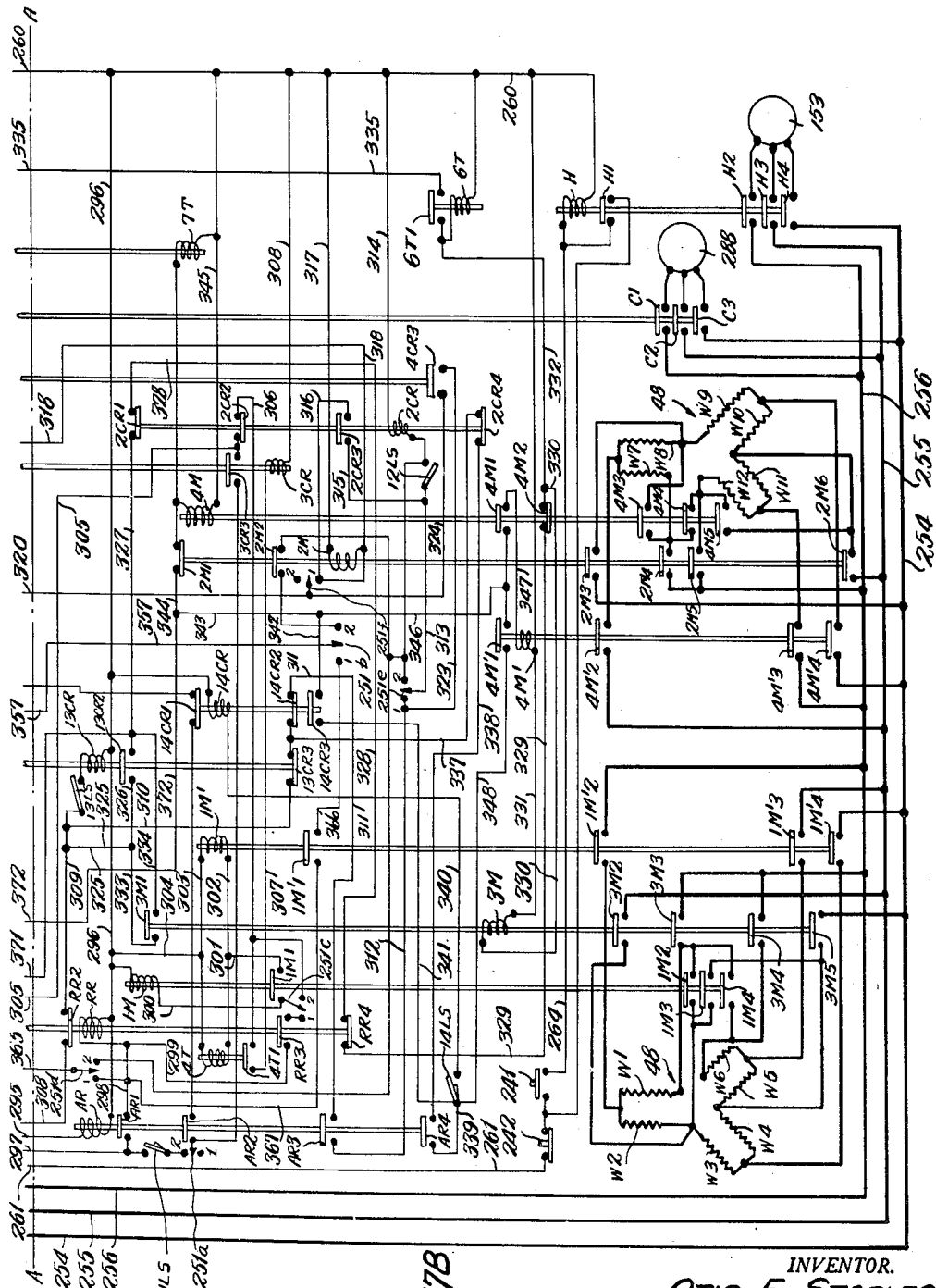

United States Patent Office 2,773,407
Patented Dec. 11, 1956

2,773,407

TURNING MACHINE

Otis E. Staples, Euclid, Ohio, assignor to The Cleveland Hobbing Machine Company, Euclid, Ohio, a corporation of Ohio Application June 30, 1951, Serial No. 234,608

2 Claims. (Cl. 82—14)

The present invention relates to an apparatus for machining material and, more particularly, to machines and tools for successively forming a plurality of different diameter portions on a workpiece in one continuous operation, the invention being an improvement over that disclosed in the copending application of Otis E. Staples, S. N. 68,004, filed December 29, 1948, now Patent No. 2,701,495 issued Feb. 8, 1955.

An object of the present invention is the provision of a novel and improved apparatus for machining material to provide articles having a plurality of connected portions of different diameters, the successive operations being sequentially effected at preselected speeds of rotation, rates of feed and to predetermined diameters with a minimum of attention on the part of the operator so that accurately machined articles can be efficiently produced by relatively unskilled operators.

Another object of the invention is to provide an improved machine tool for performing machining operations as defined in the preceding paragraph wherein the shape and dimensions of the article machined are determined by a linearly movable cam which automatically accurately positions the turning tool or tools for each of the separate operations, while the speed of rotation of the work and the rate of feed are automatically controlled by the feeding movement.

A more specific object of the invention is to provide an apparatus or machine of the type defined in the preceding paragraphs and wherein the feeding movement is hydraulically effected in a vertical direction with electrical switches, adjacent the path of the feeding movement, sequentially operated in response to that movement for controlling the rate of the feeding movement and the speed of rotation of the work.

A further object of the invention is to provide an improved apparatus or machine of the type defined above wherein the turning tool or tools are of uniform cross section and are so supported that resharpening is effected by grinding on only the end face thereof and a resharpened tool or tools may be readily replaced in the machine without need of adjusting its angularity relative to the work.

An additional object of the invention is the provision of an improved turning machine employing a non-rotatable, elongated tool of uniform cross section supported with its axis inclined both vertically and horizontally relative to the axis of a work supporting and rotating spindle and having a means for effecting longitudinal adjustment of the tool without altering the angularity thereof relative to the axis of the spindle.

The invention also has as an object the provision of novel tool holding means for supporting elongated, uniform cross section, turning tools at the proper angularity relative to a rotatable work piece while permitting longitudinal adjustment of the tools, whereby initial adjustment and compensation for wear of the tool, due to resharpening, may be effected solely by longitudinal adjustment and there is no necessity for grinding the side faces of the tool or alteration of its angularity relative to the work when resharpening.

A further object of the invention is the provision of a novel tool holder as defined in the immediately preceding paragraph and in which the tool holder is adapted to be removably mounted upon a supporting means with the holder and supporting means having cooperating interfitting surfaces which interengage to accurately orient the holder relative to the supporting means so that a holder and the tool or tools therein may be replaced as a unit without alteration of the angularity between a tool thus supported and the adjacent workpiece.

The invention further resides in certain novel features of construction and combination and arrangement of parts, and further objects and advantages thereof will be apparent to those skilled in the art to which it pertains from the following description of the present preferred embodiment thereof, described with reference to the accompanying drawings in which similar reference characters represent corresponding parts in the several views and in which:

Fig. 4 is a fragmentary, horizontal sectional view taken approximately on the line 4—4 of Fig. 3 and illustrating a portion of the drive for the work spindles;

Fig. 5 is a detached view, partly in section and partly in elevation, illustrating another portion of the drive for the work spindles, the view being taken approximately on the line 5—5 of Fig. 3;

Fig. 6 is a plan view of one of the tailstock mechanisms for supporting work in the machine;

Fig. 7 is a detached view of one of the novel tool supporting means of the invention and the cam controlling its position, the tool holder and tools illustrated being those employed for making a roughing cut, a work piece turned by the tools also being shown adjacent thereto;

Fig. 8 is an end view of the tool supporting means and tools of Fig. 7 as seen from the right-hand side of that figure;

Fig. 9 is a fragmentary top plan view of the forward position of Fig. 7;

Fig. 10 is a fragmentary view, principally in top plan with parts in section, illustrating the holder and tool for effecting a facing operation;

Fig. 11 is an end view of Fig. 10 as seen from the right-hand side thereof;

Fig. 12 is a side elevation view of the tool holder and tool illustrated in Figs. 10 and 11;

Fig. 13 is a detached top plan view of a tool holder and tools utilized for effecting a finishing cut;

Fig. 14 is a side elevational view of the structure shown in Fig. 13 as seen from the left-hand side thereof;

Fig. 15 is an end view of the structure shown in Figs. 13 and 14;

Fig. 16 is a simplified, somewhat diagrammatic, representation of the fluid pressure system employed for actuation of the tools and for feeding movement of the work relative thereto; and, Figs. 17A and 17B, taken together in vertical alignment, comprise a simplified, schematic wiring diagram of the electrical circuit for the machine.

While the invention is susceptible of embodiment in various forms in alternative constructions, it is herein shown and described as incorporated in a vertical turning machine wherein two workpieces are simultaneously operated upon, the work being rotated about parallel, vertically extending axes and in cutting relationship with non-rotatable, elongated, uniform cross section, turning tools supported at an angle relative to the work. These tools are so mounted and controlled that they turn different diameters on the workpieces as a relative feeding movement is effected between the latter and the tools or cutters in a direction longtiudinally of the axes of rotation of the work. The machine includes mechanism for automatically positioning the tools, varying the speed of rotation of the workpieces and/or varying the rate of feeding movement during different portions of the feeding movement so that the cutting operations are always performed at cutting speeds consistent with the requirements of the tools and work. The machine also includes controls enabling the machine to operate under manual control rather than automatically and/or for effecting an entire machining operation at but one rotational speed and feeding rate of the workpieces. Preferably, a roughing cut is effected upon one workpiece while the adjacent workpiece, which has previously been so rough cut, is subjected to a finished cutting or turning operation. As will hereinafter appear, the invention also employs a novel means for supporting the tools so that the latter may be resharpened by grinding only the end face thereof and such grinding, as well as the removal and replacing of the tools, does not alter their angularity relative to the work.

Figure 1:
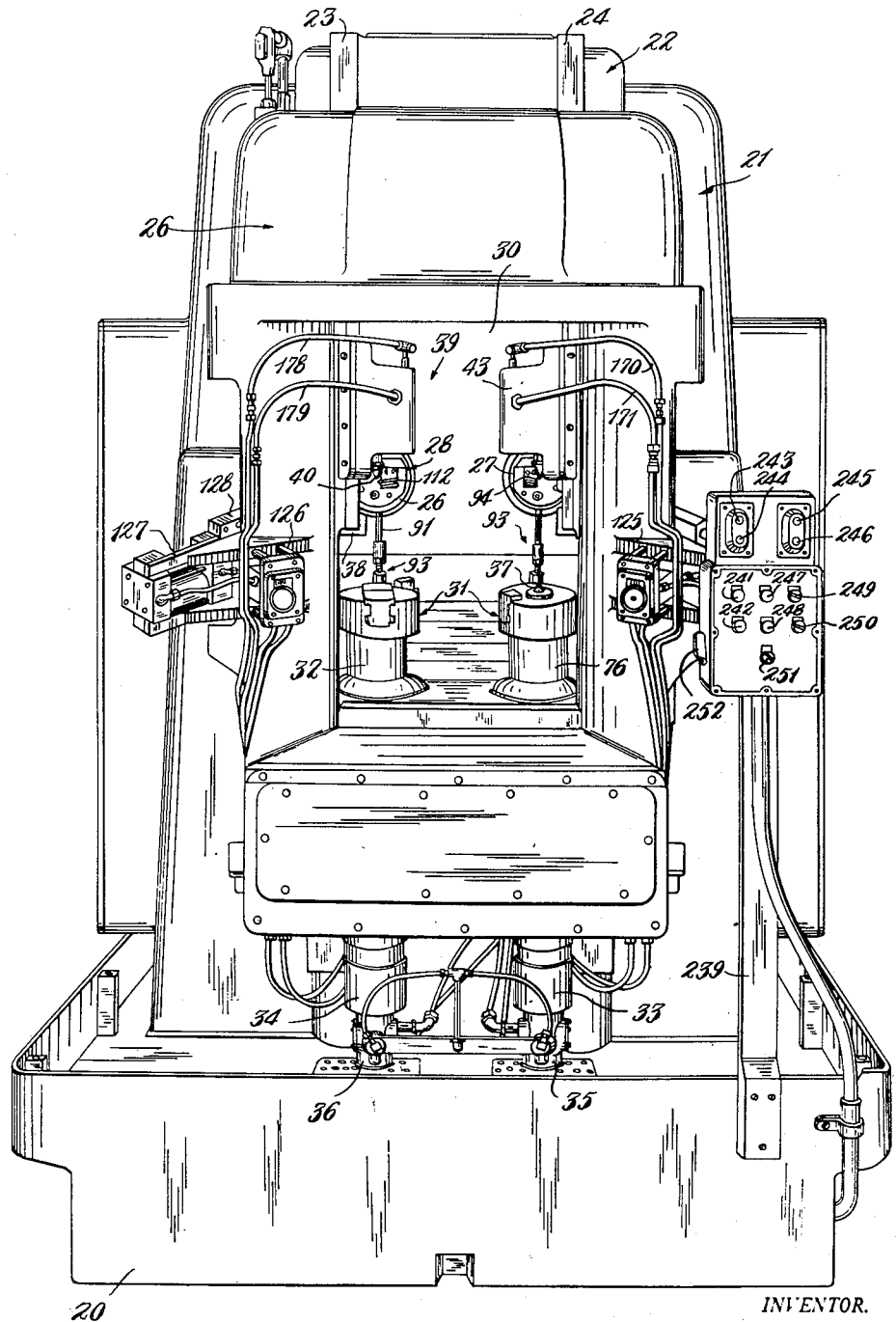
Fig. 1 is a front perspective view of a machine constructed in accordance with this invention.
Figure 2:
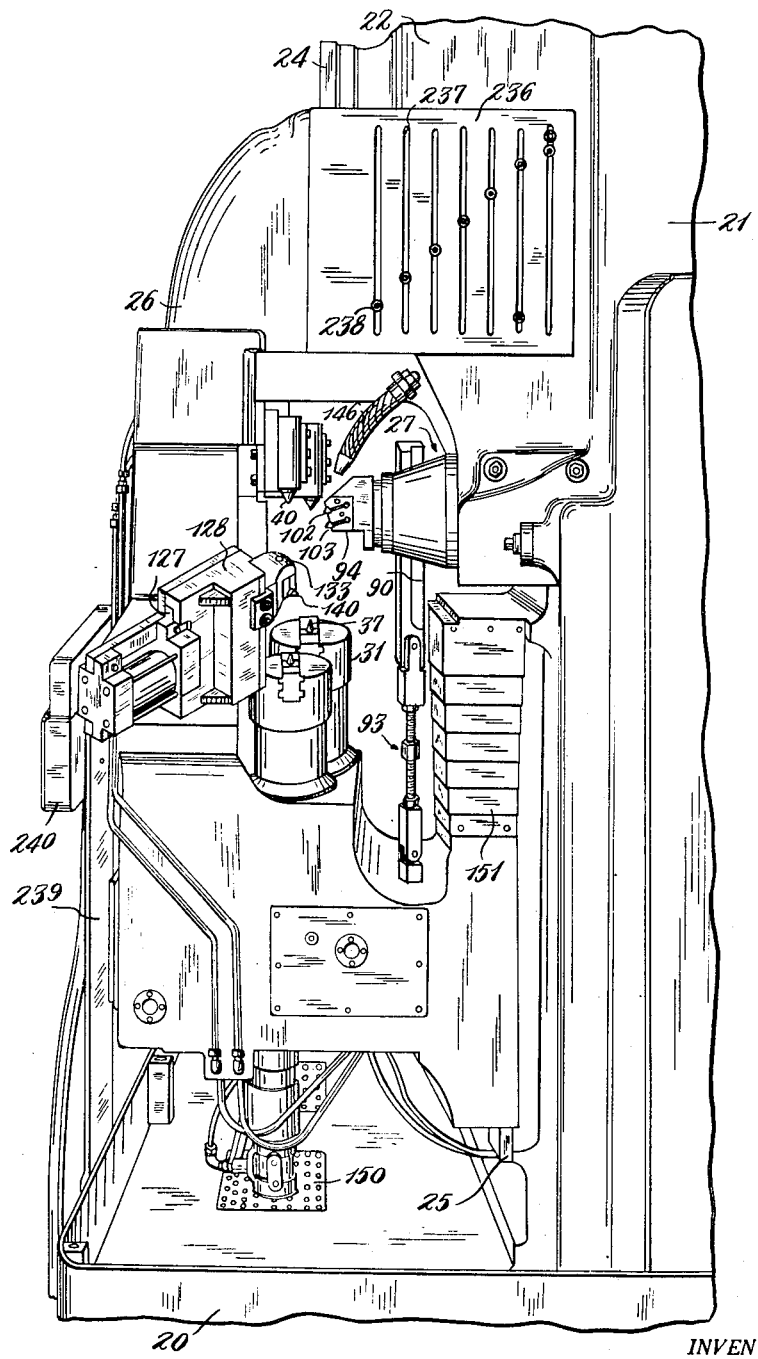
Fig. 2 is a fragmentary side perspective view of the machine as seen from the right-hand side of Fig. 1.
Figure 3:
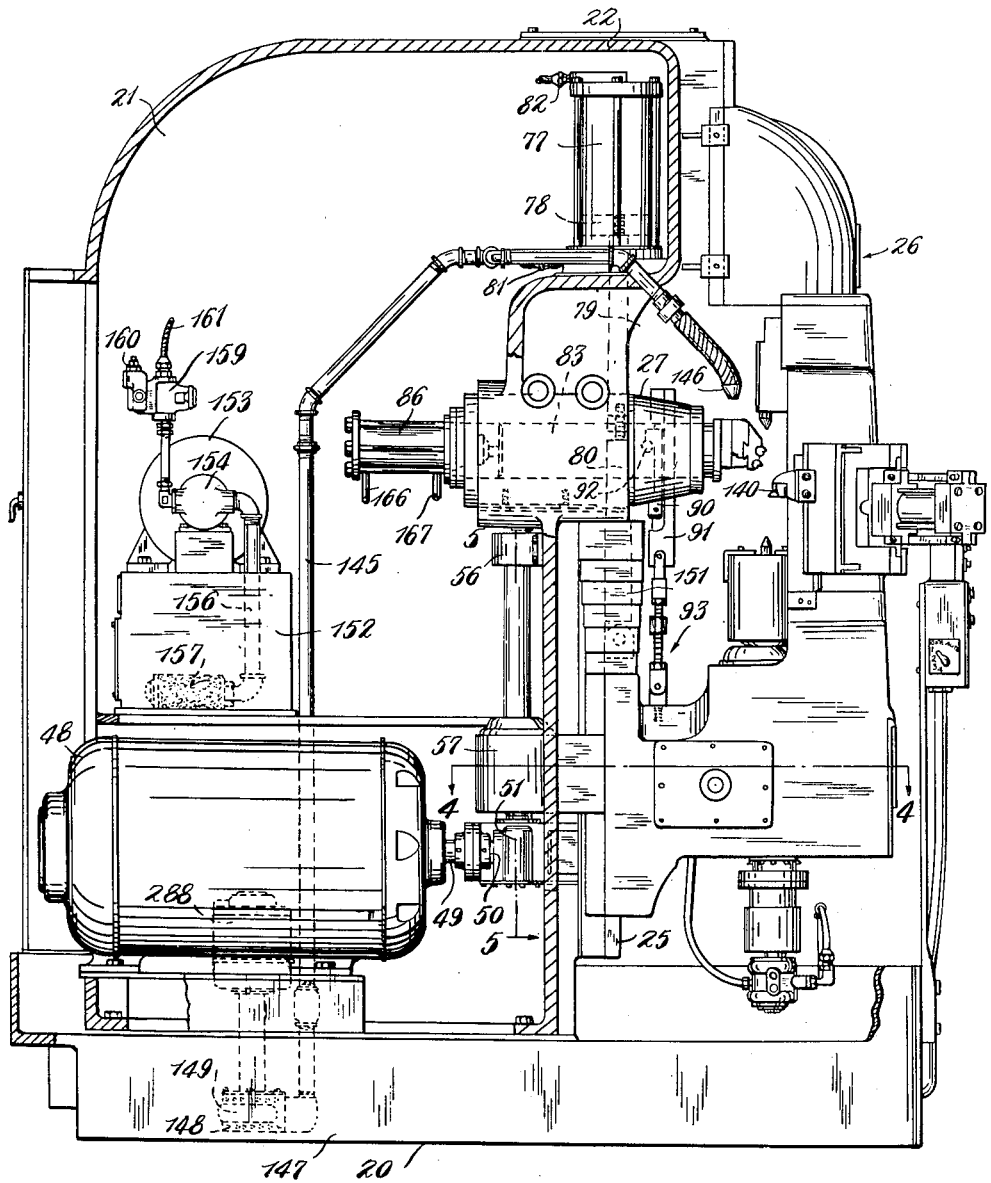
Fig. 3 is a side view partially in section and partially in elevation, the view being taken from the left side of Fig. 1 with the side wall of the stationary portion of the frame broken away and with certain parts omitted to more clearly illustrate the construction.

Referring first to Figs. 1, 2 and 3 of the drawings it will be seen that the illustrated machine is of the vertical type and comprises a frame formed by a base 20 which supports a vertical hollow column 21, the latter, in turn, including a forwardly projecting portion 22. Provided upon the forwardly projecting portion 22 of the column are spaced parallel extending ways 23 and 24 which, together with parallel spaced ways 25, adjacent the base of the column, jointly support a second frame member or workhead 26 for vertical movement. The vertical column 21 is also provided with two horizontally spaced tool heads 27, 28 on that face of the column which is adjacent the workhead. The tool heads are each provided with longitudinally slidable tool supporting means hereinafter described in detail.

The workhead 26 is provided with two means for supporting and rotating workpieces or work blanks, which supporting means are so disposed that the workpieces mounted thereon are engaged and machined by tools carried by the tool heads 27 and 28 when the workhead 26 is moved vertically relative thereto. Therefore, the workhead 26 is preferably provided with a central opening therethrough, designated 30, see Fig. 1, which is so disposed as to afford access to either of the work supporting means from a single station adjacent the front of the machine so that the operator may place and remove the work and observe the operation of both portions of the machine without leaving the operating station adjacent the controls.

The means for supporting and rotating each of the two workpieces operated upon by the machine are identical and hence only one of these devices will be described in detail. As will be apparent from Figs. 1 and 4, the workhead 26 is symmetrical about a vertical center line with each of the work holding and rotating means located equal distances from either side of that center line and adjacent the sides of the central opening 30. These work holding and supporting means each comprise a chuck, generally designated 31, supported on the upper end of a hollow spindle such as 32, see Fig. 4, which is rotatably supported with its axis extending vertically in the lower portion of the workhead 26 by means of antifriction bearings, not shown. At the lower end of each spindle is a hydraulically operated actuator 33, 34, respectively, adapted to have fluid under pressure admitted thereto and exhausted therefrom under control of separate solenoid actuated valves 35, 36. The fluid pressure actuators 33, 34 each comprise a cylinder in which is disposed a piston, see Fig. 16, provided with a piston rod which has a connection with a rod extending upwardly through the hollow bore of the associated spindle and connected with the chuck thereon to actuate the latter as is more fully shown and described in my aforementioned application, S. N. 68,004.

The chucks 31 herein illustrated are of the universal type with radially movable jaw members actuated by bell crank levers, not shown, which are connected with the piston rods of the actuators 33 and 34. The construction is such that when fluid under pressure is applied in one direction to the cylinder of an actuator, the piston therein moves the piston rod upwardly thereby moving the chuck jaw members radially outwardly and effecting gripping upon a central opening of a hollow workpiece. A release of the jaws from the workpiece is effected by applying fluid pressure to the actuator cylinder in the opposite direction, thereby moving the parts in a reverse direction. When the workpiece is of the type which is to be gripped externally, fluid pressure is applied in the direction which moves the actuator piston rod downwardly, whereupon the chuck jaw members move inwardly to grip the work therebetween. In the form of the chuck here illustrated, a center point 37 is shown centrally of each chuck for cooperation with a drilled opening or recess in the workpiece to center the latter in the chuck. This may be utilized or omitted as desired and forms no part of the invention.

The upper portions of the sides of the opening 30 through the workhead 26 are provided with spaced, vertically extending, ways 38 which are adapted to adjustably support tailstock mechanisms, generally designated 39, the tailstock mechanisms being retained in any adjusted position by suitable locking means cooperating with the ways. The tailstock mechanisms are identical and each comprises a tail center or center point 40 which is adapted to be longtiudinally moved by a fluid pressure operated mechanism in which the center point is rotatably supported.

The fluid actuating means for the tailstock mechanisms comprise cylinders 41 and 42, see Fig. 16, each of which is secured in a recess of a mounting bracket 43 by a clamping plate 44 secured to the bracket, see Fig. 6. Adjustment of the axis of the tail center 40 is effected by means of tapered gibs positioned between the cylinder 41 and the bracket 43 and actuated by adjusting screws 45.

Each cylinder 41, 42 is provided with suitable fluid pressure inlet and exhaust openings, see Fig. 16, with the application of fluid under pressure to the cylinders and the exhaust therefrom being effected under control of solenoid operated valves 46 and 47 as hereinafter described. For the present it is sufficient to note that, when fluid pressure is applied above the piston in either one of these mechanisms, the tail center 40 thereof is moved downwardly to engage a recess or opening in the upper end of a workpiece which has been inserted in the chuck on the spindle located therebelow, the tail center cooperating with the chuck to center and support the work. Conversely, when fluid pressure is applied below the actuating piston of the tail center actuator, the center is moved upwardly away from the upper end of the workpiece so that the latter may be removed. The apparatus may be readily connected to either cause the chucks to grip the workpieces before the tail centers are engaged therewith or conversely.

Rotation of the work spindles at any of a plurality of different speeds is effected by a multi-speed electric motor 48 located within the hollow frame of the machine, see Fig. 3. This motor is preferably of the three-phase, alternating current, multi-speed type such that its windings may be selectively energized to provide a given number of different predetermined speeds. The illustrated motor is so constructed and connected into the control circuit, as hereinafter described, as to provide four different speeds. It will be understood, however, that motors of other types and having different numbers of predetermined speeds may be provided depending upon the requirements of a particular machine.

The armature shaft 49 of the motor 48 is coupled to a shaft 50 suitably journalled in a housing 51 which is mounted upon the lower portion of the column 21 adjacent the ways 25. The shaft 50 has a helical pinion 52 keyed thereto which meshes with a helical gear 53 keyed to a lower end of a vertically extending shaft 54, see Fig. 5. The shaft 54 is rotatably supported adjacent its lower end in the housing 51 while its upper end is rotatably supported by suitable bearings 55 in a bearing mounting bracket 56 attached to the inner face of the forward portion of the vertical column 21. Intermediate its ends, the shaft 54 is splined for a considerable portion of its length and this splined portion extends through a gear housing 57 which may be integral with the inner lower end of the workhead D or may be a separate housing attached to the workhead, the column 21 having a suitable vertically elongated opening through which the gear housing projects. Within the gear housing 57, the shaft 54 is provided with a helical gear 58 suitably keyed or otherwise connected with the splines on the shaft 54 so as to be rotated thereby and slidable therealong. The gear 58 meshes with a helical gear 59 keyed to or otherwise connected upon the outer end of a forwardly extending shaft 60.

The shaft 60 extends horizontally through the lower portion of the workhead 26, substantially centrally thereof, and is provided at its forward end with a gear 61 which drives a gear 62 through a change gear or train of change gears, generally designated 63. The gear or gears 63 are mounted upon studs such as 64 which are adjustably mounted in slots provided in a mounting plate or plates such as 65, the construction being such that, by altering the position of the stud or studs 64 in the slots of the plate 65, differing numbers and/or sizes of gears in the gear train 63 may be employed to provide a given speed and/or direction of rotation of the gear 62 with respect to the gear 61. The gear 62 is connected for rotation with the outer end of a shaft 66 journalled, by suitable anti-friction bearings 67 and 68 in a horizontal bore in the workhead, the inner end of the shaft 66 being provided with a gear 69 which meshes with a gear 70 secured to the work spindle 32 intermediate the ends of the latter.

The gear 61 also drives a gear 71 through a change gear or train of gears 72 which are similar to the gear or gears 63. The gear 71 is connected on the outer end of a shaft 73, journalled in a horizontal bore in the workhead, and this shaft has its inner end connected with a gear 74 which meshes with a gear 75 upon the other work spindle 76 of the machine. The work spindle 76 and its chuck are identical with the work spindle 32 and chuck 31 and hence will not be described in detail.

Vertical movement of the frame member or workhead 26 relative to the column 21 and base 20 is effected by a fluid pressure actuated mechanism which comprises a cylinder 77 supported in the forwardly projecting portion 22 of the frame and containing a piston 78 which is connected with the piston rod 79, see Figs. 3 and 16. The piston rod 79 extends downwardly below the portion 22 of the frame and is connected by means of a suitable link or pull rod 80, to the lower portion of the workhead 26. The cylinder 77 is provided with fluid pressure connections 81, 82 adjacent either end through which fluid under pressure may be admitted to and exhausted from the cylinder 77 on either side of the piston 78, to thereby cause the piston to move within the cylinder and effect a corresponding movement of the workhead. As will be hereinafter described, this machine includes means for supplying fluid under pressure at different predetermined rates to the cylinder 77 for effecting feeding movement at a plurality of different rates and/or to provide a rapid traverse movement. The speed of movement of the workhead is preferably successively changed automatically, in accordance with the vertical movement of the workhead, to provide the proper feeding rate for the machining operations on each portion of the workpiece. Moreover, the apparatus is capable of being manually operated at any selected one of the predetermined speeds thereof, as will be hereinafter apparent. While only a single fluid pressure actuated lift cylinder 77 has been shown, it will be apparent that a plurality of such cylinders may be employed, if necessary or desired; the operations will, however, be the same since the cylinders would then simply be connected to the workhead in parallel and would act together.

As mentioned heretofore, the portion 21 of the frame is provided with a pair of tool supporting heads 27 and 28. These tool supporting heads are substantially cylindrical members, each mounted in a separate cylindrical boss in the forward face of the column 21 and clamped at an adjusted position therein. Each tool head is provided with a central bore in which a tool supporting member such as 83, 84 is slidably keyed for movement longitudinally of the tool head. Attached to the rear of each tool head is a fluid pressure operated mechanism comprising a stationary cylinder and a piston movably therein with the piston of each of these actuating mechanisms connected to the corresponding tool supporting member. Thus, the tool supporting member 83 is connected with a piston 85 in the cylinder 86 of one of the fluid pressure actuating mechanisms while the tool supporting member 84 is connected with a piston 87 in the cylinder 88 of the other fluid pressure actuating mechanisms, see Figs. 3 and 16. The cylinders 86 and 88 are provided with connections, on either side of their pistons, to a source of fluid under pressure, the application of which to the two cylinders is simultaneously controlled by a solenoid actuated valve 89 as hereinafter described. For the present it is sufficient to note that when fluid under pressure is supplied to the rear of the pistons 85 and 87, the corresponding tool supporting members 83 and 84, and the tools thereon, are urged forwardly towards the work upon the adjacent work spindles 32 and 76.

Movement of the tool supporting members and the tools thereon, in the direction of the work spindles, however, is governed by linearly moving cams such as 90, see Fig. 3, one for each tool supporting member. The cams 90 have a configuration representative of the desired shape and dimensions of the surfaces to be formed upon the workpieces, and since the machine is normally to be employed for effecting a roughing cut on a workpiece on one spindle and a finishing cut on a workpiece on the other spindle, the cams 90 are substantially identical. Each cam is removably supported in a cam holder 91 which in turn is slidable through aligned vertically extending slots in the tool head, 27 or 28, and the corresponding tool supporting member, 83 or 84, with the cam surface on the cam 90 positioned for engagement by a roller 92 mounted in the tool supporting member. The lower end of each cam holder 91 is adjustably connected to the lower portion of the workhead 26 by means of the pivoted links and adjusting screws, generally designated 93, which are of conventional nature and permit adjustment of the cam 90 relative to the roller 92 as will be readily understood.

The construction just described is such that when fluid pressure is applied to the rear of the cylinders 86 and 88, the tool supporting members 83, 84 attempt to move forwardly, but are controlled in this movement by the abutment of the rollers 92 with the surfaces of the cams 90. As the workhead 26 moves upwardly during the machining operation the surfaces of the cams 90 in cooperation with the rollers 92 determine the position of the tools carried by the members 83, 84 which are continuously urged forwardly by fluid pressure. Hence, the cams 90 govern the shape and dimensions of the work pieces being turned, the desired shape and dimensions of the workpiece being readily changed by replacing the cams 90 with others having the desired configuration since the cams are interchangeably supported in the cam holders 91. When the turning operations are completed the tool supporting members and the tools thereon are retracted by application of fluid under pressure to the cylinders 86 and 88 in advance of the pistons 85 and 87.

The forward end of the tool supporting member 83 is provided with a removable tool holder 94 which is so constructed and arranged that it may be readily removed and replaced without altering the angularity of the tools relative to the axis of the work spindle or of the work supported thereon. As shown in Figs. 7 and 9, the tool holder 94 for effecting a roughing cut is preferably supported upon the tool supporting member 83 by means of a bracket member 95 which is generally angular in configuration and is bolted or otherwise secured to the forward face of the tool supporting member 83, for example by means of the machine screws 96. The bracket member 95 and the tool holder 94 have cooperating interfitting surfaces such as 97, 98, 99 for accurate positioning of the tool holder, the latter being held in this position by machine screws 100, 101. In the illustrated embodiment, the cooperating surfaces 97, 98, 99 are illustrated as planar and intersecting each other in a solid right angle, but it will be apparent that other types of inter-engaging surfaces may be employed, if desired, so long as they facilitate removable mounting of the tool holder 94 relative to the tool support member 83 and accurately predetermine the angular relationship therewith. It will be also apparent that while the tool holder 94 is shown as mounted upon a bracket 95 which is in turn connected with the tool supporting member 83, in certain instances the bracket member 95 may be made integral with the main body of the tool supporting member 83. The tool holder 94 removably and adjustably supports the roughing tools 102, 103 in proper relationship for effecting a machining operation upon a work piece W which is herein illustrated as a member upon which connected portions of different diameters are to be sequentially turned.

In accordance with this invention the tools 102 and 103 are so supported that they may be longitudinally adjusted without altering their angular relationship with respect to the axis of the work spindle or the work supported thereon and hence resharpening of the tools may be effected by grinding or otherwise reconditioning the end face only of the cutters or tools without the necessity of altering the side faces thereof. This not only materially lessens the amount of work necessary for resharpening and the time required therefor, but also reduces the time and effort required to replace the tools in the machine and adjust the tools relative to the work. Furthermore, these operations are thus simplified to an extent that relatively unexperienced operators can perform the necessary tasks.

In the illustrated embodiment the aforementioned desirable features of the tools and the tool holders is achieved by having the tools 102 and 103 elongated and substantially uniform in cross section, the shape of the tools here shown being substantially triangular in cross section. These tools are supported in elongated openings extending transversely of the forward face of the tool holder 94 with the said openings inclined both horizontally and vertically relative to the axis of the work W. The said openings in the tool holder 94 are of configuration complementary to the tools 102, 103 so that the latter may be longitudinally moved within the openings, without altering their angular relationship with respect to the axis of the work, to cause the ends of the tools to project from the holder sufficiently for engagement with the work in a machining operation. As shown in Figs. 7 and 8, the openings for the tools 102 and 103 are parallel, and the opening for the tool 103 is at a greater distance from the axis of the work than is the opening for tool 102, so that the tools 103 and 102 sequentially engage the work in that order as the latter is fed vertically upwardly by movement of the workhead 26.

The tools 102 and 103 are individually longitudinally adjustable within their openings in the holder 94 by means of adjusting screws 104 and 105 which are threaded in tapped bores in the bracket member 95 and project into the rear ends of the openings for the tools into abutment with the latter. It will be apparent, therefore, that by adjusting the screws 104 and 105, the corresponding tools 102 and 103 are longitudinally adjusted without altering their angular relationships. The tools are clamped in any adjustable position by means of clamping screws, such as 106 and 107, which extend in a general vertical direction through the tool holder 94 perpendicular to slots or saw cuts extending rearwardly from the openings for the tools thereby forming clamping portions for the tools.

It will be readily apparent from the construction just described that the angularity of the tools 102 and 103 relative to the work is determined by the positions and inclinations of the openings for the tools in the tool holder 94 which are so designed as to provide the proper clearance angles for the tools. Hence, as the tools become dull or worn, they may be sharpened by grinding or otherwise reconditioning the end faces only and the tools are properly adjusted relative to the work by merely longitudinally adjusting them by means of the screws 104 and 105. Hence, sharpening of the tools by grinding or like operation on the end face only has no effect upon the clearance angles so that the side faces of the tools need not be changed. If different angularity of the tools relative the work is desired, this is readily achieved by replacing the entire tool holder 94 by a similar holder in which the tools such as 102 and 103 have the proper angular relationship for the desired operation. These new tools will likewise be properly positioned relative to the work by simply clamping the tool holder in place by means of the screws 100 and 101, since the interfitting surfaces 97, 98, 99 will properly position the tool holder relative to the work.

The tools for effecting a finishing cut upon a workpiece are supported in a manner employing the same principles as those mentioned with respect to the tools for rough cutting, but the specific structure for supporting the finishing tools is somewhat different. As shown in Figs. 13 and 15, the tool supporting member 84 for the finishing tools is provided on the forward face thereof with an angular bracket member 108 which is removably secured to the tool supporting member by suitable means such as machine screws 109. The forward face of this bracket member 108 is provided with a guideway 110 which is inclined both horizontally and vertically relative to the axis of the adjacent work spindle. This guideway slidably supports an interfitting guide surface 111 provided on the rear of a tool holder 112, the tool holder being clamped in an adjustable position relative to the bracket member 108 by means of a clamping plate 113 which preferably has a surface cooperating with the guide surface 111 on the tool holder and adapted to be drawn into clamping relationship therewith by suitable means such as, for example, screws 114. In the illustrated embodiment, the guide surface 111 is formed as an elongated dove tail while the guideway provided by the bracket member 108 and the clamping plate 113 is complementary thereto. Consequently, the tool holder 112 may be longitudinally adjusted without altering its angular relationship with respect to the tool supporting means 84 or the axis of the work spindle 76. This adjustment is effected by means of an adjusting screw 115 which is threaded within the tapped bore in a plate 116 secured to the outer end face of the bracket member 108 by means of screws 117 and 118.

The finishing tools 119 and 120 are here illustrated as being elongated and of uniform cross section and are brazed or otherwise rigidly secured in the tool holder 112 in spaced parallel relationship with the tool 120 at a greater radial distance from the axis of the work spindle than the tool 119. The specific workpiece, which is assumed as being formed in the machine and which is designated W in Fig. 7, has two shoulders 121 and 122 of different diameters spaced from each other longitudinally along the axis of the work piece. Consequently the finishing tools 119 and 120 are spaced vertically a distance corresponding to the longitudinal distances between the shoulders 121 and 122 on the work and the tools having suitable surfaces 123 and 124 for forming the said shoulders. These surfaces 123 and 124 extend uniformly the entire longitudinal lengths of the tools so that sharpening of the tools may be effected upon the end faces thereof by removing a portion thereof and of the adjacent end face of the tool holder 112 without altering the other surfaces of the tool or the tool holder. This does not alter the angular relationship of the tools nor of the surfaces 123 and 124 and proper positioning of the tools is achieved by adjustment of the holder 112 by means of the screw 115. The holder 112 may be readily removed and replaced without altering its proper angular relationship by simply unclamping the plate 113 and when tools of other characteristics are to be utilized, they are provided in holders similar to holder 112 and have the same guide surface 111 thereon, so that each holder will be supported and clamped in the same manner as the illustrated tool holder.

In addition to the above described tools for turning the various diameter portions of the work, both for roughing and finishing cuts, the apparatus of this invention further includes tools for effecting a facing cut upon the workpiece after the portions of different diameters have been turned. For this purpose workhead 26 has both sides of the vertical portion thereof provided with suitably mounted pads, such as 125 and 126, see Fig. 1, on which are supported suitable guides such as 127, see Fig. 2, which slidably support a tool mounting means such as 128, for longitudinal sliding movement towards workpiece W in a direction transversely of the axis of the latter. As shown, the tool mounting means on both sides of the workhead 26 are identical, as are the tools supported thereby, and are actuated for longitudinal movement by hydraulic means comprising cylinders 129 and 130, respectively, in each of which is disposed a piston such as 131 connected with the adjacent tool mounting means 128. The cylinders 129 and 130 are provided with suitable connections for the application of fluid pressure thereto on either side of the pistons therein, both cylinders being controlled by a single solenoid operated valve 132, see Fig. 16.

The tool mounting means 128 for each of the facing cutters removably supports a bracket member 133 which preferably has a dove tail portion 134 at the rear thereof which is clamped by a plate 135 and a screw or screws 136 in firm engagement with a correspondingly shaped surface in the mounting means 128. The bracket member 133 is provided with a recess in its forward portion which has surfaces interfitting with complementarily shaped surfaces upon a tool holder 136 for locating and securing the tool holder in accurate predetermined relationship with respect to the bracket 133, screws such as 137, 138 and 139 being provided for securing the tool holder 136 to the bracket 133 as will be readily apparent from Figs. 10 and 12 and in substantially the same manner as was previously described for the tool holder 94. The tool holder 136 is provided with an elongated opening adjacent its forward end for receiving and clamping a tool 140. In the illustrated embodiment, the tool 140 is substantially triangular in cross section and is of uniform cross section throughout its length. The tool holder 136 is slotted in a direction extending rearwardly from the tool opening to provide a lower resilient portion 141 for effecting a clamping action upon the tool 140. This clamping action is effected by means of a clamping screw 142 which extends through aligned openings in the bracket 133 and the tool holder 136 with the lower end of the screw threaded into a tapped opening of the portion 141 of the holder. The tool 140 may be adjusted longitudinally of its opening by means of an adjusting screw 143 which is threaded into a tapped opening of the bracket 133 and extends into engagement with the rear portion of the tool 140. The adjusting screw 143 is held in any adjusted position by means of a clamped screw 144.

It will be seen, therefore, that the facing tools 140, of which there is one on each side of the machine, are similar in construction and are supported in a manner similar to the tools 102, 103 and the tool holder 95 previously described. Consequently, it will be apparent that the tools 140 may likewise be resharpened by a grinding operation on their end face only without altering the angular relationship of the tools relative to the work and that the tools may be easily positioned within the machine at the proper angularity relative to the work. Moreover, if a different angle between the work and the tool is desired this can be readily secured by substituting for the tool holder 136 a similar holder having the openings for the tool 140 at the desired angle. The tool for effecting the finishing facing cut is supported in similar manner to the tool 140.

The tool mounting means 128 and the tool carried thereby are moved relative to the workpiece by fluid operated means as previously mentioned, the limits of this movement being determined by suitable adjustable stops which are not disclosed in detail since they form no part of the invention. The manner in which the apparatus is controlled to effect actuation of the facing tools at the proper time in the cycle of operations is hereinafter described in detail in conjunction with the mode of operation of the apparatus.

During the machining operations a coolant or cutting fluid is preferably supplied to the tools and workpieces through a suitable conduit, such as 145, which has two branches, one for each tool head. Each branch of the conduit 145 is provided at its outer end with a nozzle portion 146 for directing the fluid over the adjacent tool and workpiece. The conduit 145 extends into a reservoir or sump 147 in the base 20 of the machine, the coolant or cutting fluid being withdrawn therefrom through a filter 148 and forced through the conduit 145 by means of a coolant pump 149. The upper surface of the base 20 below the workhead 26 is preferably provided with suitable openings 150 which may be covered with wire mesh, gratings, or the like to allow return of the coolant or cutting fluid to the sump while retaining the chips from the machining operation upon the upper surface of the base. In order to prevent injury to the lower ways 25 for the workhead and to prevent the entrance of dirt or chips between the workhead and the ways, the pull rod 80 and the ways 25 may be shielded by suitable telescoping guards, such as 151 attached at the opposite ends thereof to portions of the workhead and to the stationary frame, respectively.

As mentioned heretofore, operation of the chucks and tailstocks for the machine, vertical movement of the workhead, and movement of the tools towards and from the work are all effected by fluid pressure operated actuators. In the embodiment illustrated, the fluid employed is preferably a liquid, such as oil or the like, the application of which to the several actuators is controlled by electrically operated valves in a manner hereinafter described. The hydraulic system of the machine will be readily apparent from consideration of Fig. 16 which is a somewhat schematic showing of the entire fluid system. Briefly stated, liquid for operating the several actuators is contained within a tank or reservoir 152, preferably disposed within the hollow column 21 of the machine, see Fig. 3, the liquid being withdrawn therefrom and delivered to the various actuators by a suitable pump or pumps operated by a single electric motor 153, the pressure of the liquid being regulated by one or more settable pressure relief valves. Thus, as shown in Fig. 16, the motor 153 is connected to drive two different pumps 154 and 155, the former being provided for supplying the fluid pressure for operation of the several tailstock and chuck mechanisms as well as the tool actuating cylinders, and the latter pump supplying the fluid pressure for operation of the lift cylinder 77 which effects the vertical movement of the workhead.

As shown in Fig. 16, the inlet connection 156 for the pump 154 is provided, interiorly of the reservoir 152, with a strainer 157. The outlet connection 158 of this pump is provided with a pressure relief valve 159 which may be set to a predetermined pressure so that pressures in excess thereof are relieved to the reservoir through the conduit 160. The pressure relief valve 159 is also connected with a main pressure supply conduit 161 to which the solenoid operated valves 35, 36, 46, 47, 89 and 132 are connected in parallel. These valves are of conventional construction and such as to be normally closed but opened and held open by associated solenoids which are connected in a suitable electrical control circuit illustrated in Figs. 17A and 17B, hereinafter described in detail.

For the present, it is sufficient to note that each of the valves is adapted to selectively supply fluid under pressure through either of two conduits connected, respectively, with the pressure inlet and exhaust openings for the corresponding cylinder. When one of these conduits is being supplied with fluid under pressure, the other of said conduits is connected through the valve to a drain conduit which is, in turn, connected with a common drain conduit 162 returning the fluid to the reservoir 152. Thus, the valve 89 has a solenoid actuator CTS for selectively communicating its fluid pressure supply conduit 163 with either of the conduits 164 and 165 which are connected, respectively, with the pipes or conduits 166 and 167 for the turning tool cylinders 86 and 88. Simultaneously, the other of these conduits 164, 165 is placed in communication with the drain conduit 168 of the valve. Likewise, the tail stock cylinder 41 has its valve 46 operated by a solenoid actuator 1TSS to selectively communicate its fluid pressure inlet conduit 169 with either of the two conduits 170 and 171 for supplying fluid under pressure to the cylinder, the other of these conduits being simultaneously placed in communication with the drain conduit 172 of the valve. The chuck 31 which cooperates with this tailstock to hold and center a workpiece has its valve 35 operated by a solenoid actuator 1CKS to control application of fluid under pressure from the conduit 173 to either of the conduits 174, 175 connected to the actuating cylinder 33, the other of these conduits being then in communication with the drain conduit 176. The valve 47 for operating the second tailstock is provided with a solenoid actuator 2TSS for selectively communicating its pressure conduit 177 to either of the conduits 178, 179 which are connected to the tailstock actuating cylinder 42, the other of the conduits being simultaneously placed in communication with the drain conduit 180. The second chuck has its operating valve 36 operated by a solenoid actuator 2CKS which selectively intercommunicates the pressure conduit 181 of the valve with either of the conduits 182 or 183 which are connected with the chuck actuating cylinder 34, the other of these conduits then being in communication with the drain conduit 184 of the valve.

The valve 132 for controlling the application of fluid under pressure to the facing cutter cylinders 129 and 130 is similarly operated by a solenoid FGS to selectively intercommunicate its pressure conduit 185 with either of the conduits 186 or 187 which are, respectively, connected to the ports at either ends of the cylinders 129 and 130. Simultaneously, the other of the conduits 186 and 187 is placed in communication with the drain conduit 188. Between the valve 132 and the cylinders 129 and 130 the conduit 186 is connected to separate metering valves 189, 190 and by-pass valves 191, 192. As shown in Fig. 16, there is a separate metering and by-pass valve for each cylinder with the metering valve in series with the cylinder and valve 132 and the by-pass valve connected in parallel thereabout. The by-pass valves 191 and 192, when open, allow fluid under pressure to be rapidly supplied to the cylinders, 129 and 130 while closing of these valves causes the fluid under pressure to be supplied at a slower rate under control of the metering valves 189 and 190, which are adjustable. The by-pass valves 191 and 192 are each provided with a roller 193, 194, respectively, which are adapted to be engaged by a cam surface, not shown, on the facing tool supporting means 128 and thereby operate the valves to open position as the facing tools 140 begin to move towards the work, the valves automatically closing as permitted by the said cam surface. By this construction the facing tools are provided with both a rapid traverse and a feeding movement, the rapid traverse being provided by the by-pass valves while the feeding movement is provided by the metering valves 189, 190 after the by-pass valves have been closed as the result of the aforementioned cam surface moving beyond the rollers 193 and 194.

The inlet of the pump 155 is provided with a conduit 195 extending into the tank or reservoir 152 and provided on its inner end with a strainer 196. The outlet of the pump 155 is connected to a pressure relief valve 197 which is adapted to be set to a predetermined pressure so that pressures in excess of that value are relieved to the tank or reservoir 152 through a conduit 198. Normally, however, the outlet side of the relief valve 197 is connected by a conduit 199 to a double-acting valve 200, which is adapted to be actuated in one direction by a solenoid actuator 200A and in the other direction by a solenoid actuator 200B. The valve 200 is adapted to place the conduit 199 in communication with either of two conduits 201, 202 and to simultaneously communicate the other of these conduits with an exhaust conduit 203 providing return for the fluid to the reservoir 152. The conduit 201 is connected with the conduit or fluid connection 82 at the upper end of the lift cylinder 77, while the conduit 202 has a plurality of solenoid operated valves connected thereto, in parallel, for controlling the application of fluid under pressure at different rates to the connection 81 at the lower end of the cylinder 77, thereby controlling the rate of movement of the workhead.

The conduit 202 is connected with a valve 204 by means of a conduit 205. The valve 204 is normally closed but is operated to open position by a solenoid actuator 1FS, thereby placing the conduit 205 in communication with a conduit 206 which is connected to an adjustable metering valve 207 for regulating the rate of flow of the fluid under pressure. The outlet of valve 207 is connected by a conduit 208 to a check valve 209 and the latter is connected with the aforementioned conduit or connection 81 of cylinder 77 by a conduit 210. The valve 207 is adjusted to provide a predetermined rate of flow of fluid under pressure therethrough so that the rate of application of fluid pressure to the cylinder 77 may be selected and maintained at a predetermined value to thereby provide a first feeding rate of movement to the workhead. The valve 204 is also provided with a conduit 211 which is connected with a drain conduit 212 leading to the previously mentioned drain conduit 203. The construction is such that, when the solenoid actuator 1FS is energized, the valve 204 is operated to supply fluid pressure from the conduits 202, 205 through the valve 204, conduit 206, metering valve 207, conduit 208, check valve 209 and the conduit 210 to the cylinder 77 below the piston 78 therein. When the solenoid 1FS is deenergized the valve 204 terminates the communication between the conduits 202, 206 and connects the latter to the drain 212. If desired, a suitable drain may also be provided for the metering valve 207. The check valve 209 is of the conventional type adapted to permit flow therethrough only from conduit 208 to conduit 210 and to block flow in the opposite direction.

Also connected with the conduit 202 is a conduit 213 leading to a valve 214 operated by a solenoid actuator 2FS. This valve is similar in construction and operation to that designated 204 and is therefore provided with conduits 215, 216 for supplying fluid under pressure to a metering valve 217 or for draining the valve to the drain conduit 212, respectively. The metering valve 217 is similar to the valve 207 and is adjusted to regulate the rate of flow of fluid under pressure therethrough. The valve 217 is connected by a conduit 218 to the check valve 219 and the latter is connected by the conduit 210 to the cylinder 77 so that fluid pressure may be supplied to the latter at a rate such as to provide a second rate of feeding movement of the work head. Likewise, a conduit 220 interconnects the conduit 202 with a valve 221 operated by a solenoid actuator 3FS to selectively supply fluid under pressure to a conduit 222 or to drain the valve through a conduit 223, the latter being connected with the drain conduit 212. The conduit 222 is connected with a metering valve 224 which is adjusted to provide fluid under pressure at a rate to effect a third rate of feeding movement of the workhead, the fluid under pressure flowing from the valve 224 through a conduit 225 and a check valve 226 to the conduit 210 and thence to the lift cylinder 77.

A conduit 227 interconnects the conduit 202 to yet another solenoid operated valve 228 which is actuated by a solenoid 4FS to supply fluid under pressure from the conduit 227 through a conduit 229 to a metering valve 230, and from the latter through a conduit 231 and a check valve 232 to a conduit 210 connected to the cylinder 77. The metering valve 230 is adjusted to effect a fourth rate of flow of fluid under pressure for effecting a fourth feeding movement of the workhead at a fourth rate. Since this rate of movement is relatively fast, these last-mentioned valves and connections may be employed for effecting a rapid traverse movement of the workhead. The valve 228 is, like the valve 204, connected to the drain conduit 212 by a suitable conduit such as 233.

Intermediate the conduit 205 and the valve 200, the conduit 202 is connected to a conduit 234 which is connected through a check valve 235 to the conduit 210 and hence to the lower fluid pressure connection 81 for the cylinder 77. It will be observed that the check valve 235 is so connected as to allow flow of fluid therethrough only in a direction reverse to that permitted through the previously mentioned check valves 209, 219, 226 and 232 thereby providing an exhaust passage for the space in cylinder 77 beneath the piston 78 when the valve 200 places conduit 202 in communication with the exhaust conduit 203.

As mentioned heretofore, the valve 200 is of the double-acting type, and is adapted to be operated in reverse directions by its actuators 200A and 200B and, preferably, the valve 200 returns to its neutral position when neither of the actuators 200A and 200B are energized. When the actuator 200A is energized, the valve 200 is positioned to connect the conduit 199 with the conduit 202 and hence energization of one of the valve actuators, such as 1FS, 2FS, 3FS or 4FS, will supply fluid under pressure at the preselected rate determined by the setting of the corresponding metering valve, such as 207, etc., to the lower fluid connection 81 for the lift cylinder 77. The upper fluid connection 82 of the lift cylinder will be simultaneously connected, through the conduit 201 and the valve 200, to the exhaust conduit 203. Hence, the piston 78 is moved upwardly at a rate depending upon the rate of the supply of fluid pressure through the metering valve corresponding with the particular valve, for example 204, that has been operated. When the lift cylinder has thus elevated the workhead a predetermined distance, the application of fluid under pressure at that given rate is terminated, as hereinafter described, and another of the valves 204, 214, 221, 228 is then operated to supply fluid under pressure through the associated metering valve to the lift cylinder at a different rate. Thus, four rates of feeding movement may be imparted to the workhead by selective operation of valves 204, 214, 221 and 228, the valve actuator 200A remaining energized throughout these movements of the workhead. When the workhead has been elevated to its desired maximum position, the solenoid 200A is deenergized and the solenoid 200B is energized. This moves the valve 200 so that the fluid under pressure from the conduit 199 is now supplied to the conduit 201 and hence to the upper end of the cylinder 77, while the lower end of the cylinder is connected through the conduit 210 and the check valve 235 to the conduit 234 which is now connected through valve 200 with the exhaust conduit 203. Hence, the workhead is rapidly returned to its lowermost position. If desired, a metering valve, or the like, may be supplied in the conduit 234 to regulate the rate of this return.

The actuation of the solenoid operated valves, 200, 204, 214, 221 and 228, may be effected either manually or automatically. In the automatic operation these valves are operated in response to predetermined vertical extents of movement of the workhead by means of electrical switches positioned upon the stationary portion of the machine and cooperating with switch actuators carried by the workhead. These several switches are similar to those illustrated in the Staples Patent 2,362,318, and in the aforementioned Staples application S. N. 68,004, and are mounted for actuation in substantially the same manner. As hereinafter described, however, the switches are connected in a control circuit which is different from that shown in the prior patent and the application so that the operations of the instant machine are different.

As will be seen in Fig. 2, one side of the workhead 26 is provided, adjacent the top thereof, with a plate 236 having a plurality of substantially parallel, vertically extending slots such as 237. These slots are adapted to have suitable studs 238 adjustably secured therein which studs may themselves actuate the stationary switches, carried by the upper portion 22 of the column of the machine, or carry buttons or cams for this purpose. Preferably, but one switch is positioned for cooperation with the stud or cam in each individual slot, the several studs or cams and switches being similar to those shown in Fig. 6 of Patent 2,362,318. In the instant embodiment, seven slots 237 are provided since there are six workhead controlled switches which normally govern the feeding movement and the speeds of rotation of the spindles. The additional slot provides for a stud or studs to cooperate with a switch connected to produce a rapid movement of the workhead without rotation of the work.

Adjacent the forward portion of the right-hand side of the machine is a vertically extending standard or support 239, the upper end of which is provided with a control box 240 containing various operator actuated switches such as push button switches 241, 242, 243, 244, 245, 246, 247 and 248 and turn switches 249, 250 and 251. In addition, the side of the control panel or box 240 is provided with a turnable actuating handle 252 for operating a drum-type selector switch 253, which is adapted to be positioned for effecting either automatic operation of the machine or selected manually controlled operations at either of the four different feeding rates of the workhead, this switch also being provided with a neutral or "off" position.

The connections of the several mentioned motors, switches and the solenoids of the various valves, the power contactors, and the control relays are schematically illustrated in Figs. 17A and 17B which together represent a simplified electrical circuit for the machine with various conventional protective devices, such as current overload switches, fuses and the like, omitted. For clarity of illustration, the relays and contactors, in some instances, have the contacts thereof disposed at some distance from the operating coil. However, in all such cases the related contacts are shown as mechanically interconnected with the actuating coil disposed around the mechanical connection of the contacts.

Three-phase electrical power is supplied to the machine from power supply lines L1, L2 and L3 which are connected with the main power lines or leads 254, 255 and 256 of the machine through a disconnect switch 257. Power for operating the aforementioned solenoids CTS, 1TSS, 1CKS, 2TSS, 2CKS, 200A, 200B, 1FS, 2FS, 3FS, 4FS and FGS, which control the several valves, is obtained from the power wires or leads 258 and 259 connected, respectively, with the power lines or leads 254 and 256. Power for operation of the various motors is derived from extensions of the power lines or leads 254, 255 and 256, while power for operation of the relays and contactors is derived from wires or conductors 260, 261 connected to the secondary 262 of a step-down transformer, the primary 263 of which is connected to the main power lines 254 and 255 for the machine. An understanding of the circuit and the relationships of the various switches, relays, solenoids, and contactors can best be had from a description of a cycle of operation of the machine or apparatus in conjunction with Figs. 17A and 17 B.

*Automatic operation*

Let it be assumed that the apparatus is to be operated under automatic control. The operating handle 252 of the selector switch 253 is positioned in alignment with the indicium marked "auto," thus positioning the switch 253 to interconnect its stationary contacts 253a and 253b with each other and also to interconnect its stationary contacts 253c, 253d and 253e with each other. This may be effected either by conductive strips or by interconnected spaced contacts carried by the movable portion of the drum switch which engaged the stationary contacts when the switch is actuated. As illustrated, the movable portion of the drum has spaced movable contacts which are strapped together to provide the above-mentioned interconnections.

The several switch actuating studs or cams 238, see Fig. 2, are adjusted within the slots 237 to positions corresponding with those at which a change in operation is to be effected. Thus, the first four cams, counting from left to right in Fig. 2, cooperate, respectively, with limit switches 11LS, 12LS, 13LS and 14LS, which, as hereinafter described, effect changes in the rate of feeding and the speed of rotation of the work spindles. Hence, these studs or cams are positioned to actuate the corresponding switches at the several vertical positions of the workhead at which changes in the feed and speed of rotation should be effected and which positions correspond to the different diameters to be formed on the workpieces. The stud 238 in the fifth slot actuates a switch 15LS which controls initiation of the movement of the facing tools 140 and provides for the preselected speed of rotation of the work spindles during the facing operation. The studs 238 in the sixth slot 237 control a limit switch 1LS which determines the limits of movement of the workhead and the return of the latter to its initial position, while the studs 238 in the seventh slot 237, which are adapted to actuate a limit switch 2LS, may be used when a rapid upward movement of the workhead is desired without rotation of the work spindles. Therefore, the last-mentioned studs are normally disposed, as shown, at positions where they do not actuate the associated switch 2LS.

With the studs or cams 238 thus set, the operator then moves the switches 249 and 250 to closed positions, operates switch 251 to place its movable contacts 251a, 251b, 251c, 251d, 251e and 251f in engagement with its stationary contacts designed "1" and then closes the disconnect switch 257. Closing of switch 257 supplies electrical energy to the power wires or lines 254, 255, 256, 258 and 259 and, through the transformer, to the wires 260 and 261. The operator next actuates the push button switch 241, see Fig. 17B, thus closing a circuit from the wire 261 through the stop switch 242, switch 241, wire 264 and the coil of a contactor H energizing the latter. Consequently, the contactor H closes its normally open contact H1 thus providing a holding circuit about the start switch 241 so that the contactor H remains energized after the push button of switch 241 is released. Contactor H also closes its normally open contacts H2, H3 and H4 thereby connecting the power supply lines 254, 255 and 256 to the leads for the hydraulic pump motor 153, energizing the latter and thus operating the pumps 154 and 155 to supply fluid under pressure through the conduits 161 and 199.

The operator next positions a workpiece for support by the chuck 31 and tail center 40 of the roughing operation spindle, which is illustrated as being the right-hand spindle as viewed in Fig. 1, and then presses the start button 243. This closes a circuit from the control circuit power line 261 through the stop switch 244, switch 243, and the coils of contactor 1CK and relay 1T to the wire 260, thereby energizing the contactor 1CK and relay 1T causing the former to close its normally open contacts 1CK1, 1CK2, 1CK3 and 1CK4. The relay 1T is a timing relay so that its contact 1T1 does not close until a predetermined time after the relay is energized. Closing of contact 1CK3 provides a holding circuit around the start switch 243, through wire 265, normally closed switch 246, normally closed contact 3T1, contact 1CK3 and wire 266, so that contactor 1CK and relay 1T remain energized after the button of switch 243 is released. The closing of the contacts 1CK1 and 1CK2 completes a circuit from the main power line 258 through the solenoid 1CKS of the valve 35. Hence, the valve 35 is operated to supply fluid under pressure to the corresponding cylinder 33 causing the chuck 31 to grip the workpiece.

The timing relay 1T is so set that its contact 1T1 does not close until after the chuck has been actuated to work gripping position thus ensuring gripping of the work before it is engaged by the corresponding tail center 40. When contact 1T1 does close it completes a circuit from wire 266 through the contacts 1T1 to a wire 267 thence through the coil of contactor 1TS to a wire 268 connected to the wire 260. This causes contactor 1TS to close its normally open contacts 1TS1, 1TS2, 1TS3 and 1TS4. Closing of the contact 1TS3 provides a by-pass about the contact 1T1, while closing of the contacts 1TS1 and 1TS2 energizes the solenoid 1TSS of the tail center actuating valve 46 so that the latter is operated to supply fluid under pressure to the cylinder 41 thus moving the corresponding tail center into engagement with the work which has just been gripped in the chuck.

A second workpiece, preferably one which has previously been rough cut and on which a finishing operation is now to be performed, is supported upon the other work spindle of the machine by placing the workpiece within the other chuck, in alignment with the corresponding tail center, and actuating the button of start switch 245. This closes a circuit from wire 261 through stop switch 244, wire 265, stop switch 246, start switch 245, wire 269 and the coils of contactor 2CK and relay 2T to the wire 260. The resulting energization of contactor 2CK causes it to close its normally open contacts 2CK1, 2CK2, 2CK3 and 2CK4. Closing of the contact 2CK3 provides a holding circuit about the start switch 245 through the said contact, a wire 270 and contact 3T1. Closing of contacts 2CK1 and 2CK2 connect the solenoid 2CKS of valve 36 to the power lines 258 and 259. The valve 36 is therefore moved to almit fluid under pressure to the operating cylinder 34 for the other chuck thus causing the latter to grip the workpiece. The relay 2T is a timing relay and hence its contacts 2T1 are not closed until a predetermined time after energization thereof, the time interval being sufficient to allow proper gripping of the work. Closing of contact 2T1 completes a circuit through it and the previously closed contact 2CK3 to wire 271 thence through the coil of contactor 2TS and wire 268 to the wire 260. This causes contacts 2TS1, 2TS2, 2TS3 and 2TS4 to close. The contact 2TS3 provides a by-pass circuit about the contact 2T1 while the closing of contacts 2TS1 and 2TS2 energizes solenoid 2TSS. This actuates the valve 47 to supply fluid under pressure to cylinder 42 for operation of the second tail center into engagement with the workpiece therebelow.

While the apparatus is here illustrated and described as operating to first clamp or grip the workpieces by the chucks and thereafter engage the clamped work by the tail centers, this sequence may be readily reversed by simply interchanging the leads of solenoid 1CKS with those of solenoid 1TSS and by interchanging the leads of solenoid 2CKS with those of solenoid 2TSS. The tail centers will then operate before the chucks so as to center the work before it is clamped, since contacts 1CK1, 1CK2 will now control solenoid 1TSS, contacts 1TS1, 1TS2 will control solenoid 1CKS, contacts 2CK1, 2CK2 will control solenoid 2TSS, and contacts 2TS1, 2TS2 will control solenoid 2CKS.

After the workpieces are thus clamped the operator next presses the main start button 247. This closes a circuit from the wire 261 through the normally closed stop switch 248, contacts 253a and 253b, which are bridged as the result of the initial setting of switch 253, to switch 247 and through the latter to wire 272, thence through wire 273 to the normally closed contact 5CR5. From contact 5CR5 this circuit continues through a wire 274, then through the now closed contacts 1CK4 and 2CK4 to a normally closed contact D3, the circuit being completed from the latter through a wire 275 and the coil of contactor 1CR to a wire 276 connected with the wire 260. The resulting energization of the contactor 1CR causes it to close its contacts 1CR1, 1CR2, 1CR3 and 1CR4. The closing of contact 1CR4 provides a holding circuit for the 1CR contactor around the start button 247, through wires 277, 278, contact 1CR4 and wire 279, so that the button of switch 247 may be released. Closing of the contacts 1CR1 and 1CR2, completes a circuit from the wire 258 through the solenoid 200A of the valve 200, to the wire 259. The energization of the solenoid 200A actuates the valve 200 to a position which supplies fluid under pressure from the conduit 199 to the conduit 202.

The actuation of push button switch 247 also completed a circuit therethrough and through wires 272, 280 to switch 250, which was initially placed in the "on" position, the circuit continuing therefrom through wire 281 to and through the normally closed contact 9T1 of a timing relay 9T thence through wire 282 and the coil of contactor CT to wire 283 which is connected with wire 260. The resulting energization of contactor CT causes it to close its contacts CT1, CT2 and CT3 and open its contact CT4. Closing of contacts CT1 and CT2 energizes solenoid CTS thereby operating valve 89 thereby applying fluid pressure at the rear of cylinders 86 and 88 thus urging the turning tools carried upon the corresponding tool supporting members towards the work spindles. The extent of movement of the tools in this direction is determined by the engagement of the rollers 92 with the cams 90 carried by the workhead. The tool supporting members 83 and 84 are continuously urged in the direction maintaining the rollers 92 in engagement with the cams 90, as the latter are moved upwardly during the vertical upward movement of the workhead, since valve 89 is held open by continued energization of solenoid CTS as the result of contactor CT being held energized by a holding circuit about switch 247. This circuit extends through wires 277 and 278, now closed contact 1CR4, wire 279, the now closed contact 1CR3, wires 284, 280, switch 250, wire 281, contact 9T1 and wire 282.

Closing of contact 1CR4 has also completed a circuit therethrough and through the wire 279 to a wire 285 thence through normally closed contact 5CR3 to a wire 286 connected with the contact of switch 249 which was initially placed in "on" position. The aforementioned circuit continues from switch 249 through the coil of a contactor C and wire 287 to wire 260 thus energizing the C contactor causing it to close its contacts C1, C2 and C3, see Fig. 17B. The last-mentioned contacts complete a circuit therethrough from the power wires 254, 255 and 256 to the leads of a motor 288 for the pump 149 which supplies coolant to the tools and work.

Relays 6CR and AR are also energized as the result of energization of relay 1CR. Thus, the closing of contact 1CR4 completed a circuit through wires 277, 278, contact 1CR4, wire 289 and the normally closed contact 1LS2 of switch 1LS to wire 290 and thence to and through the coil of the relay 6CR, the circuit being completed through the wire 276 to the wire 260. The circuit for energizing AR likewise extends through contacts 1CR4, 1LS2 and wire 290 to and through wires 291, 292, the normally closed contact 2LS2 of switch 2LS to a wire 293 which is in turn connected to the contact 253c of switch 253 by a wire 294. The initial positioning of switch 253 has bridged contact 253c with contact 253d and the latter is connected by a wire 295 to the coil of relay AR, the circuit being completed from the latter to the wire 260 by a wire 296. Consequently, contacts 6CR1, 6CR2, AR1, AR2, AR3 and AR4 are closed and contact 6CR3 is opened.

While switch 247 was held closed, the aforementioned closing of contact AR1 completes a circuit energizing a relay RR. This circuit extends through switch 247 to a wire 297 thence through the latter and the now closed contact AR1 to wire 298 and thence to the coil of the relay RR, the circuit being completed through wire 296 to wire 260. The resulting energization of relay RR closes its contacts RR1 and RR3 and opens the contacts RR2 and RR4. Closing of contact RR3 completes a circuit from the now closed contact AR1 through wires 298, 299 to and through contact RR3 to contact 251c of switch 251 which was initially positioned in engagement with its adjacent contact "1," thence through wire 300 to the coil of the motor contactor 1M, the circuit being completed from the latter through wire 296 to the wire 260. Energization of contactor 1M closes its contacts 1M1, 1M2, 1M3 and 1M4. Closing of contact 1M1 completes a circuit therethrough from wire 300 to wires 301 and 302 thence to the coils of relay 4T and contactor 1M', which are connected in parallel, the circuit being completed through wires 303, 304, and 296 to wire 260. Hence, relay 4T and contactor 1M' are connected in parallel with contactor 1M so that contacts 1M'1, 1M'2, 1M'3 and 1M'4 are immediately closed. Contact 4T1 does not, however, close for a predetermined time thereafter.

As mentioned heretofore, the spindle rotating motor 48 is of the three-phase, multiple predetermined speed type and, in the present instance, is adapted to be driven at four different predetermined speeds. For this purpose, the motor 48 has twelve windings, designated W1 to W12 inclusive, which are adapted to be connected, six at a time, in either a delta or a Y-type connection. The closing of the contacts 1M2, 1M3, 1M4, 1M'2, 1M'3 and 1M'4 energizes the windings W1 to W6, inclusive, by connecting these windings to the power lines 254, 255 and 256 in a Y-type connection. Consequently, the work spindles 32 and 76 are simultaneously rotated at a first rate of speed by the motor 48 being driven through the gearing previously described and which is illustrated in Figs. 4 and 5.

The interval between the time when the relay 4T is energized and the time when its contact 4T1 closes is sufficient to allow the motor 48 to attain its starting speed through energization of its windings W1 to W6 as just described. The subsequent closing of contact 4T1, while the switch 247 is held actuated, completes a circuit energizing contactor 3CR. This circuit extends from wire 277 through wire 278, the now closed contact 1CR4, wire 289, contact 1LS2, wires 290, 291 and 292, contact 2LS2, wires 293, 294, the now closed contact RR1, wire 305 to and through the normally closed contact 2CR2 thence through wire 306 to the now closed contact 4T1 and then through wire 307 to the coil of contactor 3CR, the circuit being completed through a wire 308 to wire 260. The energization of contactor 3CR closes its contacts 3CR1 and 3CR2 thus energizing solenoid 1FS causing the latter to open valve 204 thereby supplying fluid under pressure to the lift cylinder 77 elevating the workhead at its first rate of movement, it being remembered that valve 200 was previously opened by energization of solenoid 200A.

The cam or button 238, carried by the workhead for actuation of switch 12LS, was initially positioned during the set-up of the machine so that it engages and operates this switch shortly after the workhead begins to move vertically as the result of actuation of push button 247. Hence, the said push button may then be released after such vertical movement begins thus breaking the circuit through this switch which provides energization of relay RR. The resulting deenergization of relay RR opens the above-described circuits to contactors 1M, 1M' and 3CR thus deenergizing them and solenoid 1FS so that rotation of the spindles at the first speed and the supply of fluid under pressure for movement of the workhead at the first rate are terminated. However, since the relay AR is still energized, closing of switch 12LS and deenergization of relay RR now completes a circuit energizing relay 2CR. This circuit extends through wires 277, 278, contact 1CR4, wire 289, contact 1LS2 of switch 1LS, wires 290, 291 and 292, contact 2LS2 of switch 2LS, wires 293 and 294 to contact 253c of switch 253 which is connected with contact 253e. This circuit continues through wire 308 to and through the normally closed contact RR2 of relay RR, wires 309 and 310, the normally closed contacts 13CR3 and 14CR2, wire 311, the now closed contact AR3 of relay AR, wire 312, contact 251e of switch 253, wire 313 and switch 12LS to the coil of relay 2CR, the circuit being completed through wire 314 to wire 260.

The energization of relay 2CR opens the contacts 2CR1, 2CR2 and 2CR4. Also, contact 2CR3 is closed thereby closing a circuit extending from the wire 313 of the energizing circuit for the relay 2CR through a wire 315, contact 2CR3 and wire 316 to and through the coil of a contactor 2M, the circuit being completed to the wire 260 by a wire 317. Hence, the contactor 2M is energized and closes its contacts 2M2, 2M3, 2M4, 2M5 and 2M6 and opens its contact 2M1. A timing relay 5T is also simultaneously energized since it is connected in parallel with the coil of relay 2M by wires 318 and 319.

The closing of contacts 2M3, 2M4, 2M5 and 2M6 supplies three-phase electrical energy from the power lines 254, 255, and 256 to the windings W7 to W12, inclusive, of the spindle motor 48, these windings being now connected in a delta arrangement so that the spindle motor drives the work spindles at a second predetermined rate of speed. The simultaneous energization of relay 5T does not immediately cause closing of its contact 5T1 since this relay is of the delay action type. However, the contact 5T1 does close shortly after the spindles have acquired their full speed of rotation, this time delay being for the purpose of preventing movement of the workhead at the second rate of feed before the spindles are rotated at the proper speed. When contact 5T1 closes, it completes a circuit from wire 316, in the above described circuit for contactor 2M, through the contact 251f of switch 251, which was initially positioned in circuit closing relationship with wire 316, through the wire 320 and wire 321 to the now closed contact 5T1 and thence to the coil of relay 4CR, the circuit being completed to the wire 260 through the wire 322. This energizes contactor 4CR causing it to close its contacts 4CR1, 4CR2, and 4CR3. Closing of contacts 4CR1, 4CR2 energizes the solenoid 2FS, thereby operating valve 214 so that the fluid under pressure is supplied through the metering valve 217 to the lift cylinder 77 at a rate such as to cause the workhead to feed upwardly at the second rate of feeding movement thereof. Closing of the contact 4CR3 provides a holding circuit about the switch 12LS and relay 2CR, this circuit extending from wire 312 through wire 323, the now closed contact 4CR3 and wire 324 to wire 320 of the previously described circuit for contactor 4CR. Consequently, the contactors 2M and 4CR remain energized after the workhead has moved sufficiently to carry the switch actuating stud or cam 238 beyond the switch 12LS, it being remembered that this switch is of the type which is normally biased to open position.

As the workhead moves upwardly, at its second rate of feeding movement and the work spindles are rotated at their second speed, the turning tools 102, 103, 119 and 120 effect a machining operation upon the workpieces. Thus, the workpiece on the roughing spindle is turned from a blank to a configuration as determined by the portion of cam 90 contacting the roller 92 during this portion of the workhead movement and, simultaneously, the tools 119 and 120 will be effecting a finishing cut upon the other workpiece, which is similarly controlled by a correspondingly shaped cam, this workpiece having been previously rough cut in a preceding operation.

When the workhead is moved upwardly to a point at which a surface or surfaces are to be formed on the workpieces requiring a different speed of rotation of the spindles and a different rate of feeding movement, and which portion corresponds with a change in the shape of the cams 90, a switch actuating stud or cam 238 engages and operates switch 13LS moving the latter to circuit closing position. This results in energization of relay 13CR, the circuit for which extends from wire 277 to the wire 309 as previously described for relay 2CR. Now, however, the circuit continues from wire 309 through the now closed switch 13LS and the coil of relay 13CR to wire 296 which is connected with the wire 260. The resulting energization of relay 13CR causes it to open its contacts 13CR1 and 13CR3 and close its contact 13CR2. Opening the contacts 13CR1 and 13CR3 breaks the above described circuit for energization of the relay 2CR so that the contactors 2M, 4CR and relay 5T are also deenergized thus terminating feeding movement of the workhead at its second rate and the energization of the spindle motor for rotation of the spindles at their second rate of speed. The simultaneous closing of contact 13CR2 has completed a circuit from the wire 309 through wires 325, 326, contact 13CR2, wire 327, the now closed contact 2CR1, wire 328, the now closed contact RR4, wire 329, the now closed contact 4M2 and wire 330 to the coil of the contactor 3M, the circuit being completed from the latter through wire 331 to the wire 260. The timing relay 6T is also energized in parallel with the contactor 3M through a circuit comprising wire 332 and the coil of the relay 6T, the circuit being completed from the latter to the wire 260. Relay 6T is of the time delay type and hence does not immediately close its contact 6T1. This is for the purpose of providing sufficient time to allow motor 48 to bring the work spindles to the predetermined third speed of rotation before feeding movement of the workhead at the third rate is begun.

The energization of contactor 3M causes it to close its contacts 3M1, 3M2, 3M3, 3M4 and 3M5. The closing of contact 3M1 provides a holding circuit about the switch 13LS and contact 13CR2. This holding circuit extends from the wire 309 through the wire 325, wire 333, the now closed contact 3M1, and wire 334, to the wire 327. Therefore, the 3M contactor will remain energized after the 13LS switch is released as a result of the subsequent movement of the workhead upwardly at the third rate of feed movement as about to be described. Closing of the contacts 3M2, 3M3, 3M4 and 3M5 connects the motor windings W1 to W6 with the power supply line 254, 255, 256 in a delta connection thus energizing the motor 48 for rotation at its third predetermined speed.

The subsequent closing of contact 6T1 completes a circuit from the aforementioned wire 332 through the contact 6T1 and wires 335 to the coil of a contactor 7CR, the circuit being complete from the latter through a wire 336 to the wire 260. Energization of contactor 7CR causes it to close its contact 7CR1 and 7CR2 thus energizing solenoid 3FS thereby operating valve 221 to supply fluid under pressure through the metering valve 224 to the lift cylinder 77, the rate of the supply of the fluid pressure being such as to effect feeding movement of the workhead at its third predetermined rate of speed.

As mentioned heretofore, this movement of the workhead carries the stud or cam 238, which operates the switch 13LS, past the switch 13LS so that the latter is opened, thus deenergizing the relay 13CR returning its contacts to the positions as shown in the Figs. 17A and 17B. Contactor 3M and 7CR, however, remain energized as previously mentioned so that the workhead continues to move vertically at the third rate of feeding movement and the work spindles are rotated at their third rate of speed so that turning operations are performed upon the workpiece in conformity with the configurations of the cams 90. These operations continue until the workhead has moved vertically to the point at which a cam or stud 238 operates the switch 14LS. Since the relays 13CR and 2CR are now deenergized while the relay AR remains energized, the closing of switch 14LS completes a circuit energizing relay 14CR. This circuit extends as above described to the wire 309 and from the latter through the wire 310, the now closed contact 13CR3, wire 337, the now closed contact 2CR4, wire 338, the now closed contact AR4, wire 339, the now closed switch 14LS, wire 340 to and through the coil 14CR, the circuit being completed by the wire 296 to the wire 260. Energization of relay 14CR opens its contacts 14CR1 and 14CR2 and closes its contact 14CR3. Opening of the contacts 14CR1 and 14CR2 is a safety feature for preventing improper operation of relays such as RR and 2CR. Closing of contact 14CR3 energizes contactor 4M. This circuit extends from the previously mentioned wire 339 through a wire 341, the now closed contact 14CR3, wires 342, 343 and 344 to and through the now closed contact 2M1 and the coil of contactor 4M, the circuit being completed through wire 345 to the wire 260. Time delay relay 7T is also energized in parallel with contactor 4M, but does not immediately close its contact 7T1.

Energization of contactor 4M opens its contact 4M2, thus deenergizing contactors 3M and 7CR and relay T6, thereby terminating feeding of the workhead at its third rate of movement and rotation of the spindles at their third rate of speed. Closing of the contact 4M1 completes a circuit from the previously mentioned wire 342 through a wire 346 and the contact 4M1 to a wire 347 thence through the coil of the contactor 4M' and the wire 331 to the wire 260. The resulting energization of contactor 4M' causes closing of its contact 4M'1. This provides a bridging circuit for the contactors 4M and 4M' about switch 14LS and contact 14CR3, this bridging circuit extending from wire 339 through wire 348, the now closed contacts 4M'1 and 4M1 to the coil of contactor 4M" the circuit for contactor 4M extending in the same manner through contact 4M'1 but branching off between the latter contact and contact 4M1 through the wires 346, 343 and 344 to the contactor 4M. This enables the contactors 4M and 4M', as well as coil 7T, to remain energized even after relay 14CR is deenergized as the workhead moves upwardly beyond switch 14LS at its fourth rate, as is about to be described.

The closing of contacts 4M3, 4M4, 4M5, and contacts 4M'2, 4M'3, and 4M'4, as the result of energization of contactors 4M and 4M', connects the windings W7 to W12 of the spindle motor 48 with the power supply lines 254, 255, 256 in a Y-type circuit thereby providing the fourth predetermined speed of the motor and hence of the work spindles. The time delay interposed by relay 7T is sufficient so that the spindles have reached this predetermined speed before contact 7T1 is closed to complete a circuit energizing contactor U. This circuit extends from wire 277 through wire 278, the now closed contact 1CR4, wire 289, contact 1LS2 of switch 1LS, wires 290, 291 and 292, contact 2LS2 of switch 2LS, wire 349, contact 7T1 and wire 350 to one terminal of the coil for the U contactor, the other terminal of this coil being connected with the wire 260 through the wire 287. The resulting energization of the U contactor closes contacts U1 and U2 thus energizing solenoid 4FS and thereby operating the valve 228 to supply fluid under pressure through the metering valve 230 to the lift cylinder 77 causing the workhead to move upwardly at its fourth rate of feed movement. Consequently, the workpieces are now turned by the tools 102, 103, 119 and 120, in accordance with the configuration of the corresponding portions of the cams 90 while the workhead is moved upwardly at its fourth rate of feed and with the spindles rotating at their fourth speed.

In the initial setup of the machine, the stud or cam 238 for operating switch 15LS, controlling operation of the facing tools, was set for actuation of the switch during the latter part of the upper movement of the workhead, that is, during the latter part of the time that the workhead is moving upwardly at its fourth rate. This actuation of switch 15LS completes a circuit from the wire 261 through switch 244, wire 265, switch 246, the now closed contact 3T1, wire 270, the now closed contacts 2CK3 and 2T1 to wire 271, and from the latter through wire 351 and the now closed switch 15LS to and through the coil of contactor 15CR, the circuit being completed from the latter to the wire 260. The resulting energization of contactor 15CR causes it to close its normally open contacts 15CR1, 15CR2, 15CR3 and 15CR4. Closing of the contacts 15CR1 and 15CR2 energizes the solenoid FGS thus operating valve 132 to supply fluid pressure to the rear of cylinders 129 and 130 so that the tool mounting members 128 for the facing tools 140 are moved towards the work spindles. If desired, the initial portion of this movement may be relatively rapid, as has been previously described, by virtue of the tool supporting means actuating by-pass valves 191 and 192 until the tools 140 have substantially engaged the work. When this point is reached, the by-pass valves are released and move to closed position so that the fluid under pressure is supplied to the cylinders 129 and 130 only through the metering valves 189 and 190 thus causing the tools 140 to now move at a feeding rate to engage the work and perform a facing operation thereon. It will be noted that the facing tools are supported upon the workhead and hence are always at a predetermined position longitudinally of the workpieces so that the facing operations can be performed at any time during movement of the workhead or even when the workhead is at rest. In the illustration selected, however, it has been assumed that the facing operation is to be initiated adjacent the upper limit of the vertical movement, the operation being effected while the workhead is moving downwardly to its initial position.

The previously mentioned closing of contact 15CR3 provides a holding circuit for the contactor 15CR about the switch 15LS so that the contactor is maintained energized as the workhead movement carries the actuating stud 238 past the switch 15LS.

It will be remembered that the actuation of push button switch 247 at the beginning of the machining operations energized the relay 6CR. This resulted in closing of contact 6CR1 preparing a circuit for the energization of relay 5CR, but this circuit was held open at the contact 15CR4. With the energization of contactor 15CR, however, the resulting closing of its contact 15CR4 completes the circuit energizing the relay 5CR. This circuit extends from the wire 261 through the normally closed push button switch 248 and the contacts 253b and 253a to the wire 352, thence through the now closed contacts 1TS4 and 2TS4 to the wire 353 and then through the now closed contact 15CR4, wire 354 and contact 6CR1 to the coil of relay 5CR, the circuit being completed from the latter by a wire 283 connected to the wire 260. The resulting energization of relay 5CR causes it to close its contacts 5CR1, 5CR2 and 5CR4 and open its contacts 5CR3 and 5CR5. The opening of contact 5CR3 breaks the previously described circuit energizing the C contactor which controls the supply of coolant to the workpieces. However, the closing of contact 5CR4 simultaneously provides another energizing circuit for the coolant contactor C maintaining the latter operated so that the supply of coolant is not terminated. This last-mentioned circuit extends from the previously mentioned wire 353 through the wire 355, the now closed contact 5CR2, wire 356, the normally closed contact 8T2, wires 357 and 358 to and through the now closed contact 5CR4 to the coil of the contactor, the circuit being completed through the wire 287 to the wire 260.

At the end of the upward movement of the workhead one of the studs or cams 238 carried thereby operates the switch 1LS closing its contacts 1LS1 and 1LS3 and opening its contact 1LS2. Opening of the contact 1LS2 breaks the previously described circuit therethrough which controls energization of contactors U, 4M, and 4M' thus terminating the energization of the spindle motor 48 at its fourth speed of rotation and also terminating supply of fluid under pressure to the lift cylinder 77 through the valve 228 so that upward movement of the workhead is terminated. Deenergization of motor 48 allows the work spindles to coast for the purpose of reducing their speed to the lower speed which is to be utilized in the facing operation, it being understood that the previously mentioned movement of the facing tools 140 towards the work is such that the facing tools do not normally engage the work until after switch 1LS has been operated.

The aforementioned closing of contact 1LS1 has completed a circuit from the wire 277 through the wire 278, contact 1CR4, wire 279, contact 1CR3, wires 284, 272, contact 1LS1 and wire 359 to and through the coil of relay 9T, the circuit being completed from the latter through the wire 276 to the wire 260. The resulting energization of relay 9T does not immediately have any effect since this relay is of the time delay type and is provided for the purpose of allowing a dwell period with the turning tools 102, 103, 119, 120 in engagement with the work at the end of the upward movement of the workhead. When, however, the time interval for the relay 9T has elapsed, the latter operates thus opening the contact 9T1 and closing the contact 9T2. Closing of the contact 9T2 provides a circuit through the latter energizing the contactor D. This circuit extends through the previously described circuit for the coil of relay 9T and thence through the contact 9T2 and wire 360 to the coil of the relay D, the circuit being completed through wire 283 to the wire 260. The resulting energization of the D contactor opens its contact D3 thus breaking the previously described circuit for contactor 1CR so that the latter is now deenergized. The simultaneous closing of contact D4, however, has provided a holding circuit extending from the wire 277 to and through the wire 361, contact D4 and wire 273, to the wire 272 from which the circuit continues, as before described, through the contact 1LS1 maintaining relay 9T and contactor D energized. The contact 1LS1 remains closed even after the workhead begins its downward movement, as hereinafter described, since the switch 1LS is of the type which remains in any position to which it is actuated.

Although the contact D4 provides a circuit around the switch 247, contactor CT is nevertheless deenergized since the circuit thereto has been opened by the opening of contact 9T1. Consequently, solenoid CTS is deenergized so that fluid under pressure is no longer supplied through the valve 89 in the direction forcing the tool supported means 83 and 84 towards the workpieces. Instead, the valve 89 is now positioned for supplying fluid under pressure through the pipes or conduits 165 and 167 thus causing the turning tools to be retracted as the workhead is subsequently moved downwardly, this movement being limited either by the length of the slot in which the cams 90 move or by the bottoming of the pistons 85 and 87 in their cylinders.

Closing of the contacts D1 and D2 as a result of energization of contactor D has now energized solenoid 200B. Therefore, since solenoid 200A was deenergized by the deenergization of contactor 1CR, the valve 200 is now moved to a position in which fluid under pressure is supplied through the pipe or conduit 201 and the connection 82 to the upper end of the cylinder 77, thereby causing the workhead to move downwardly at a rate determined by the rate of exhaust of fluid under pressure through the valve 235. As mentioned before, a metering valve may be provided in the line 234, if desired, to further control the rate of descent of the workhead.

The aforementioned closing of contact 1LS3, as the result of operation of contact 1LS at the upper limit of movement of the workhead, completed a circuit extending from the wire 261 through push button switch 248 and the contacts 253b and 253a, which were bridged by the initial setting of switch 253, to the wire 352. This circuit continues through contacts 1TS4, 2TS4 in series to the wire 362 then through the now closed contact 1LS3 and wire 363 to the coil of relay 10T, the circuit being completed therefrom to the wire 260. As mentioned heretofore, the operation of switch 1LS has terminated the fourth speed of rotation of motor 48 so that the spindles are allowed to coast to a lower speed before the motor is again energized for the facing speed of rotation. The relay 10T is of the time delay type and its time interval is set to provide the necessary time for the spindles to reach the desired facing speed whereupon contact 10T1 of relay 10T is closed. This completes a circuit extending, as above described, to the wire 363 and therefrom to and through the now closed contact 6CR3, it being remembered that relay 6CR was deenergized by the opening of contact 1LS2 when the workhead reached its uppermost position. From the contact 6CR3 the circuit now being described extends through wire 364, contact 10T1, wire 365 to contact 251D of switch 251. The initial positioning of switch 251 placed contact 251d in engagement with the adjacent stationary contact designated "1" so that the circuit continues from 251d through wire 298 and the coil or relay RR to the wire 296 thus energizing relay RR. The energization of relay RR causes it to close its contact RR3 thus energizing contactor 1M which in turn closes its contact 1M1 and thereby energizes the contact 1M'1, as previously described, so that the spindle motor is again energized for rotation at its first speed as will now be understood, this speed having been selected for the facing speed by the initial setting of switch 251. Relay T4 is again energized but does not provide any feeding movement of the workhead since the valve 200 has been operating to provide fluid under pressure through the pipe 201 and the pipe 202 is now connected to drain.

It will be evident from the above described circuits that the facing tools 140 will have moved into engagement with the work and the work is rotated at the proper facing speed during the downward movement of the workhead. Since the tools 140 are carried by the workhead there is no change in vertical relationship between the tools and the workpieces. Consequently, the facing operation may continue throughout the entire downward movement of the workhead and even after the workhead has reached its lowermost position. Thus, although the switch 1LS is again actuated when the workhead reaches its lowermost position thereby opening contacts 1LS1 and 1LS3 and closing contact 1LS2, the spindle motor 48 is not immediately deenergized nor is the facing solenoid FGS deenergized. This follows from the fact that the energization of the 1M' contactor provided a holding circuit for the RR relay and hence for the 1M and 1M' contactors which circuit is under control of the contact 8T2 of a timing relay 8T. This circuit extends from the previously mentioned wire 352, connected with switch 253, through the contacts 1TS4 and 2TS4, wires 353 and 355, the now closed contact 5CR2, wire 356, contact 8T2, and wire 357 to contact 251b of switch 251. This contact was initially placed in engagement with its adjacent contact "1" so that the circuit continues therethrough to wire 366, then through the now closed contact 1M'1 and wire 367 to wire 298 which is connected with the coil of relay RR as above described. Also, the solenoid FGS remains energized since contactor 15CR is held energized through the above described holding circuit through contact 15CR4. The application of fluid pressure to the workhead lift cylinder 77 in a direction tending to produce downward movement is however terminated by the operation of switch 1LS which opens the circuit for the 9T relay and the D contactor so that the solenoid 200B is deenergized, allowing the valve 200 to return to its central or neutral position.

The duration of the facing operation is controlled by an interval timer in the form of a timing relay 8T which is energized to begin its timing operation when the contactor CT is deenergized for termination of the turning operation utilizing the tools 102, 103, 119, 120. This circuit for energization of the 8T relay extends from the switch 253 through wire 352 contact 1TS4, contact 2TS4, wire 353, the now closed contact 15CR4, wire 354 to and through the now closed contact CT4 to a wire 368 connected with the coil of the relay 8T, the circuit being completed from the latter through the wire 283 to the wire 260. The predetermined time interval provided by the relay 8T insures movement of the facing tool holders 128 towards the workpieces until they engage fixed stops, not shown, after which relay 8T operates to close its contact 8T1 and open its contact 8T2. Opening of the contact 8T2 breaks the previously described holding circuit for the spindle motor 48 deenergizing the latter so that the spindles rapidly come to a stop. Closing of the contact 8T1 completes a circuit through the latter from the wire 356 to a wire 369 connected with the coil of the time delay relay 3T, the circuit being completed from the latter through the wire 283 to the wire 260. Relay 3T is of the time delay type and is set to provide a sufficient time interval for the spindles to come to rest before opening of the normally closed contact 3T1 which when opened breaks the holding circuit for the contactors 1CK, 2CK, 1TS, 2TS and relays 1T and 2T. As a result contacts 1TS4 and 2TS4 are opened thus breaking the circuit to relay 8T and the contactor 15CR. Deenergization of contact 15CR deenergizes solenoid FGS so that the valve 132 is now moved back to a position in which fluid under pressure is supplied to the facing cylinders 129 and 130 through pipes 137 for effecting retraction of the facing tools. Deenergization of the contactors 1CK, 2CK, 1TS and 2TS deenergize solenoids 1CKS, 2CKS, 1TSS and 2TSS thus unchucking the work and withdrawing the tail centers. The finished workpiece may then be removed and the workpiece which has had a roughing cut put in its place while a new work blank may be placed for a roughing cut. The cycle of operations may then be repeated by simply sequentially actuating the push buttons 243, 245, and 247.

In the above described operations, the machine has been disclosed as operating to provide the several spindle speeds and feeding rates in a particular order. This has been for the purpose of facilitating the description, but it will be understood that the feed and speed changes may be obtained in sequences other than those described. Moreover, either of two facing speeds may be provided by proper setting of the switch 2S1. However, a selected facing speed can be only brought into operation during return of the workhead. In the event the second facing speed is selected, by positioning of the switch 251 to place its contacts 251a, 251b, 251c, 251d, 251e and 251f in engagement with the adjacent stationary contacts designated "2" then the limit switch 11Ls, operated by movement of the workhead, becomes effective to control the first rate of feeding movement and speed of the spindle motors. It will also be remembered that while the apparatus has been described as first clamping the work and then bringing the tail centers into engagement therewith, this sequence of operations may be reversed to provide for centering of the work first and then clamping, it only being necessary to interchange the connections for the tail centers and chuck solenoids, such as 1CKS with 1TSS and 2CKS with 2TSS. The switch 2LS is normally not utilized during operation of the machine so that the stud or cam for actuating this switch is positioned such that it does not engage the switch during normal operation. The switch 2LS when utilized, however, is effective for providing a rapid upward movement without spindle rotation under control of contactor U as will be apparent from the previous description and a study of the wiring diagram.

*Manual operation*

The apparatus is normally intended to be automatically operated as above described, but provisions are made for manual control to facilitate set up of the machine and like operations. As above, the hydraulic pump motor 153 is placed in operation by actuating push button 241, the selector switch 249 is placed in the "On" position and the cutter head switch 250 is likewise placed in the "On" position. The facing speed selector switch 251 is placed in its first position and the switch 253 is moved to its number one manual position. This last-mentioned operation connects the contacts 253a and 253b together and it also connects the contact 253c with the contact 253f. The workpieces or blanks are then loaded and secured in place by operation of the push buttons 243 and 245 as was described for the automatic operation.

The operation of push button switch 247 then energizes contactor 1CR and relay 6CR through the same circuits as described above in conjunction with the automatic operation. Also contactor CT is energized and in turn energizes solenoid CTS so that fluid under pressure is supplied to the cylinders 86 and 88 moving the turning tools toward the work. The energization of contactor 1CR energizes the solenoid 200A for supplying fluid under pressure to conduit 202. However, no turning operation is as yet performed since none of the solenoids 1FS, 2FS, 3FS and 4FS are energized and hence there is no feeding movement of the workhead and no rotation of the work spindles since none of the windings of the spindle motor 48 are energized.

The operator next turns the switch 253 to its second manual position. Contactor CR1 and relay CR6 will remain energized since the switch 253 is provided with connecting or conductive strips effecting interconnection of contacts 253a and 253b in all of the four manual positions of the switch. The new position of switch 253 now provides for interconnection of contact 253c with 253g so that a circuit is now completed from the wire 277 through the wire 278, contact 1CR4, wire 289, contact 1LS2, wires 290, 291 and 292, contact 2LS2, wires 293 and 294 to the contact 253c, thence from the latter to the contact 253g and through wire 370 to the wire 320 which is connected with the contact 251f. Since the contact 251f was originally placed in engagement with its adjacent number "1" contact, the circuit continues therefrom to the coil of contactor 2M, the circuit being completed through wire 317 to the wire 260. A parallel circuit is also closed extending from contact 251f through the wire 318 to the coil of the timing relay 5T. Consequently, the 2M contactor closes its contacts energizing the spindle motor for rotation at its second speed and a predetermined time thereafter relay 5T closes its contact 5T1 completing a circuit from the wire 370 through wire 321 and contact 5T1 to the coil of the contactor 4CR, the circuit being completed through wire 322 to wire 260. This energizes the 4CR contactor thereby energizing the 2FS solenoid so that fluid under pressure is supplied to the workhead lift cylinder 77 through the valve 214 for moving the workhead at its second feeding rate, it being remembered that the solenoid 200A has already been energized for actuating valve 200 to supply fluid under pressure to the pipe or conduit 202.

The workhead will, therefore move upwardly at its second rate of feeding movement and the spindles will be rotated until the switch 253 is turned to its manual position number "3." This breaks the circuit between contacts 253c and contact 253g thus deenergizing contactor 4CR and 2M as well as relay 5T so that the second feeding rate of the workhead and the rotation of the spindles are terminated. The new position of switch 253 connects the contact 253c with the contact 253h so that a circuit is now completed from the latter through wires 371, 327, the normally closed contact 2CR1, wire 328, the normally closed contact RR4, wire 329, the normally closed contact 4M2, and wire 330 to the coil of contactor 3M and from the latter through the wire 331 to the wire 260. Hence, the contactor 3M is energized thereby closing its contacts and thus energizing the spindle motor for rotation at its third speed. Simultaneously, the timing delay relay 6T is energized in parallel with the 3M contactor through the wire 332 so that it closes its contact 6T1 a predetermined time thereafter to complete a circuit therethrough and through wire 335 energizing the 7CR contactor. The latter closes its contacts 7CR1 and 7CR2 thus energizing the solenoid 3FS thereby operating the valve 221 to supply fluid under pressure to the lift cylinder 77 to cause the workhead to move upwardly at its third feed rate.

The workhead will continue to move upwardly at its third rate until the operator actuates switch 253 to its manual position number "4." This disrupts the circuit between the contacts 253c and 253h thereby deenergizing contactors 3M and 7CR as well as time relay 6T so that feeding movement at the third rate and rotation of the spindles at third speed are terminated. Simultaneously, a circuit is completed from the contact 253c to the contact 253i as the result of the positioning of switch 253. This completes a circuit from the contact 253i through the wire 372 to the wire 344 then through the normally closed contact 2M1 to the coil of contactor 4M and the coil of time relay 7T, which are connected in parallel to the wire 345, the latter being in turn connected with the wire 260. Consequently the contactor 4M is energized closing its motor winding control contacts 4M3, 4M4, 4M5. Also contact 4M1 is closed thus completing a circuit from the wire 372 through the wire 343 and 346 to and through the now closed contact 4M1 to the coil of the contactor 4M′ thus energizing the latter causing it to close its contacts with the result that the spindle motor 48 is driven at its fourth rate of speed. The simultaneous energization of relay 7T initiated the time interval for the subsequent operation of the contact 7T1, which time interval insures that the spindles will have acquired their proper speeds before a new feeding rate is inserted. When the contact 7T1 closes, it completes a circuit from the wire 293 through the wire 349 and the contact 7T1 to the wire 350 and thence through the coil of contactor U, the circuit being completed by the wire 287 to the wire 260. This energizes the U contactor causing it to close its contacts U1, U2, thereby energizing the solenoid 4FS so that valve 228 is operated to supply fluid under pressure to the lift cylinder 77 causing the workhead to move upwardly at its fourth rate of feeding movement.

When the workhead has reached its uppermost position, the switch 1LS is engaged and operated so that its contact 1LS2 is moved to open position and its contacts 1LS1 and 1LS3 are moved to closed positions. This opening of the contact 1LS2 breaks the circuit to the contactors U, 4M and 4M′, thereby terminating the fourth speed of rotation and the feeding movement of the workhead.

During the upward movement of the workhead, and preferably adjacent the upper limit of the movement thereof the switch 15LS is actuated as previously described under automatic operation, thus energizing the contactor 15CR providing for movement of the facing tools into engagement with the work and effecting the facing operations as has been described under automatic operation, the same portions of the circuit being utilized as before described for automatic operation and hence need not be redescribed in detail. As before, the facing speed of the spindles is brought into operation during the return cycle of the workhead and the duration of the facing operation is determined by the time interval of the timing relay 8T.

*Summary*

It will now be apparent that, in accordance with this invention, it is possible to rapidly turn workpieces having a plurality of different diameter portions without close attention by the operator and at the same time maintain close tolerances of the completed work. In fact, the only operations required by the machine operator is loading and unloading workpieces and operating a few push buttons, once the machine has been initially set up. Consequently, a high rate of production of identical parts may be achieved with substantially unskilled labor. Moreover, set-up of the apparatus is greatly facilitated by the novel tool mounting means which enable the tools to be removed and replaced without alternation of the angles between the tools and the axes of the workpieces and without the necessity of the usual, gauging operations to determine the said angles. Furthermore the tools may be sharpened by grinding or otherwise conditioning the end faces only of the tools. Also, the configuration of the workpieces produced by the machine can be readily altered by simply changing the cams 90 to those having shapes different from that illustrated and by correspondingly setting the studs to effect transition from one feeding rate and speed of spindles to another in accordance with the shape of the cams 90.

It will also be apparent from the above detailed description of one practical embodiment of the invention that changes and alterations may be made in the various details of the construction and mode of operation without departing from the spirit of the invention. It is therefore to be understood that the specific construction shown and described in detail is intended as illustrative and not restrictive of the invention, the scope of which is to be determined from the subjoined claims.

Having thus described the invention, I claim:

1. In a machine tool of the character described, the combination of a vertically extending stationary frame member, a second frame member mounted for vertical sliding movement on the first-mentioned frame member, a work spindle rotatably mounted on said second frame member, a work holding means carried by said spindle, a tool support movably mounted upon said stationary frame members for sliding movement transversely of said spindle and adapted to support a non-rotatable turning tool, means for urging said tool support towards said spindle to bring the turning tool into machining relationship with a workpiece carried by said work holding means, linearly movable cam means having a configuration determinative of the final shape of the workpiece, means supporting said cam means on said second frame member and cooperating with said tool support to regulate the position of the support relative to the spindle, means for effecting vertical movement of said second frame member, means to rotate said spindle so that a tool on said tool support sequentially turns a workpiece supported on said spindle to the shape determined by the configuration of said cam means, a second tool support carried by said second frame member, means to move said second tool support transversely relative to said spindle so that a tool on said second tool support effects a machining operation upon the workpiece, and means responsive to movement of said second frame member to a predetermined upper position thereof to effect movement of the first-mentioned tool support away from the workpiece and the second tool support towards said workpiece whereby a tool on the second tool support is operative to effect a machining operation only after the tool on the first-mentioned tool support has completed its machining operation.

2. In a machine tool of the character described, the combination of a vertically extending stationary frame member, a second frame member mounted for vertical sliding movement on the first-mentioned frame member, a work spindle rotatably mounted on said second frame member, a work holding means carried by said spindle, a tool support carried by the stationary frame member for sliding movement transversely of said spindle and adapted to support a non-rotatable turning tool, means for urging said tool support towards said spindle to bring a turning tool on the support into machining relationship with a workpiece carried by the said work holding means, cam means carried by said second frame member and cooperating with said tool support to regulate the position of the support relative to the spindle, the said cam means having a configuration determinative of the final shape of the workpiece, means for effecting vertical movement of said second frame member, means to rotate said spindle so that a tool on said tool support sequentially turns a workpiece supported on said spindle to the shape determined by the configuration of said cam means, means responsive to vertical movement of said second frame member in one direction for varying the speed of that movement and the speed of rotation of said spindle, a second tool support slidably mounted upon the said second frame member, and means responsive to movement of said second frame member to a predetermined position adjacent the end of its movement in said one direction to move said second tool support towards said spindle to bring a tool thereon into machining engagement with a workpiece on said spindle, the last-mentioned means including means maintaining the said second tool support with its tool in machining engagement with the workpiece for a predetermined time during return movement of said second frame member.

References Cited in the file of this patent

UNITED STATES PATENTS

| | | |
|---|---|---|
| 745,976 | Tindel | Dec. 1, 1903 |
| 1,415,341 | Hanson | May 9, 1922 |
| 1,434,782 | Lange | Nov. 7, 1922 |
| 2,118,020 | Curtis | May 17, 1938 |
| 2,225,327 | Walker | Dec. 17, 1940 |
| 2,342,792 | Dare et al. | Feb. 29, 1944 |
| 2,362,318 | Staples | Nov. 7, 1944 |
| 2,422,682 | Johnson | June 24, 1947 |
| 2,540,289 | Randall | Feb. 6, 1951 |
| 2,571,530 | Brekke | Oct. 16, 1951 |
| 2,628,415 | Brown | Feb. 17, 1953 |
| 2,644,224 | Chilcott | July 7, 1953 |

FOREIGN PATENTS

| | | |
|---|---|---|
| 623,357 | Germany | Dec. 5, 1935 |